(12) United States Patent
Yagishita

(10) Patent No.: US 7,870,045 B2
(45) Date of Patent: Jan. 11, 2011

(54) COMPUTER SYSTEM FOR CENTRAL MANAGEMENT OF ASSET INFORMATION

(75) Inventor: Keiji Yagishita, Kawasaki (JP)

(73) Assignee: Fujitsu Limited, Kasasaki (JP)

( * ) Notice: Subject to any disclaimer, the term of this patent is extended or adjusted under 35 U.S.C. 154(b) by 1443 days.

(21) Appl. No.: 10/200,736

(22) Filed: Jul. 24, 2002

(65) Prior Publication Data
US 2003/0135439 A1 Jul. 17, 2003

(30) Foreign Application Priority Data
Jan. 17, 2002 (JP) ............................. 2002-008475

(51) Int. Cl.
*G06Q 40/00* (2006.01)
*G06F 11/00* (2006.01)
(52) U.S. Cl. ............................................. 705/35; 714/5
(58) Field of Classification Search .................. 705/35; 714/5
See application file for complete search history.

(56) References Cited

U.S. PATENT DOCUMENTS

| 5,307,496 | A * | 4/1994 | Ichinose et al. ............. 718/104 |
| 5,655,081 | A * | 8/1997 | Bonnell et al. .............. 709/202 |
| 6,529,784 | B1 * | 3/2003 | Cantos et al. ................. 700/79 |
| 6,859,882 | B2 * | 2/2005 | Fung .......................... 713/300 |
| 6,983,317 | B1 * | 1/2006 | Bishop et al. ............... 709/223 |
| 7,231,464 | B1 * | 6/2007 | Caudrelier et al. .......... 709/253 |

FOREIGN PATENT DOCUMENTS

| JP | 63-186339 | 8/1988 |
| JP | 01-279357 | 11/1989 |
| JP | 11-279357 | 3/1999 |
| JP | 11-184732 | 7/1999 |
| JP | 11-212826 | 8/1999 |
| JP | 2000-029709 | 1/2000 |
| JP | 2006-011739 | 1/2006 |

OTHER PUBLICATIONS

Unknown, Academic Press Dictionary of Science and Technology, 1996, Academic Press.*
Unknown, Websters II New Riverside University Dictionary, 1988, Houghton Mifflin Company, p. 292 computer.*

(Continued)

*Primary Examiner*—Kirsten S Apple
*Assistant Examiner*—Scott S Trotter
(74) *Attorney, Agent, or Firm*—Staas & Halsey LLP

(57) ABSTRACT

A computer system includes one or more host computers, one or more hardware devices, and a management server for managing the assets in the system. The host computer includes an agent unit for notifying the management server of the data of the assets of the device to which it belongs based on a predetermined data structure. The hardware device includes an assets information notification unit for performing a similar process of the agent unit. The management server includes an information management unit for managing the data of the assets received from the agent unit and the information notification unit as associated with the predetermined data structure. Thus, the data of all assets in the system can be centralized using the predetermined data structure, and can be centrally managed corresponding to the structure.

10 Claims, 32 Drawing Sheets

OTHER PUBLICATIONS

Unknown, Wiley Dictionary of Communications Technology, 1998, John Wiley & Sons Ltd., utilization.*

Notice Of Rejection Grounds in corresponding Japanese Patent Application No. 2006-011739, dated Oct. 31, 2006.

Japanese Office Action dated Feb. 21, 2006 in Japanese Patent Application No. 2002-008475.

Shinji Furuya et al., Implementation of the Parallel Media Server based on FC-AL and Its Self-Control Type Management Mechanisms for Shared Resources IEICE Technical Report, vol. 99, No. 251, pp. 96-101.

Japanese Office Action in Japanese Patent Application No. 2002-008475, dated Nov. 22, 2005.

Japanese Office Action dated Sep. 25, 2007 for corresponding Japanese Patent Application No. 2007-079958.

Partial translation of Japanese Office Action dated Sep. 25, 2007 filed in IDS submitted on Dec. 21, 2007 (corresponding to Japanese Patent Application No. 2007-079958).

* cited by examiner

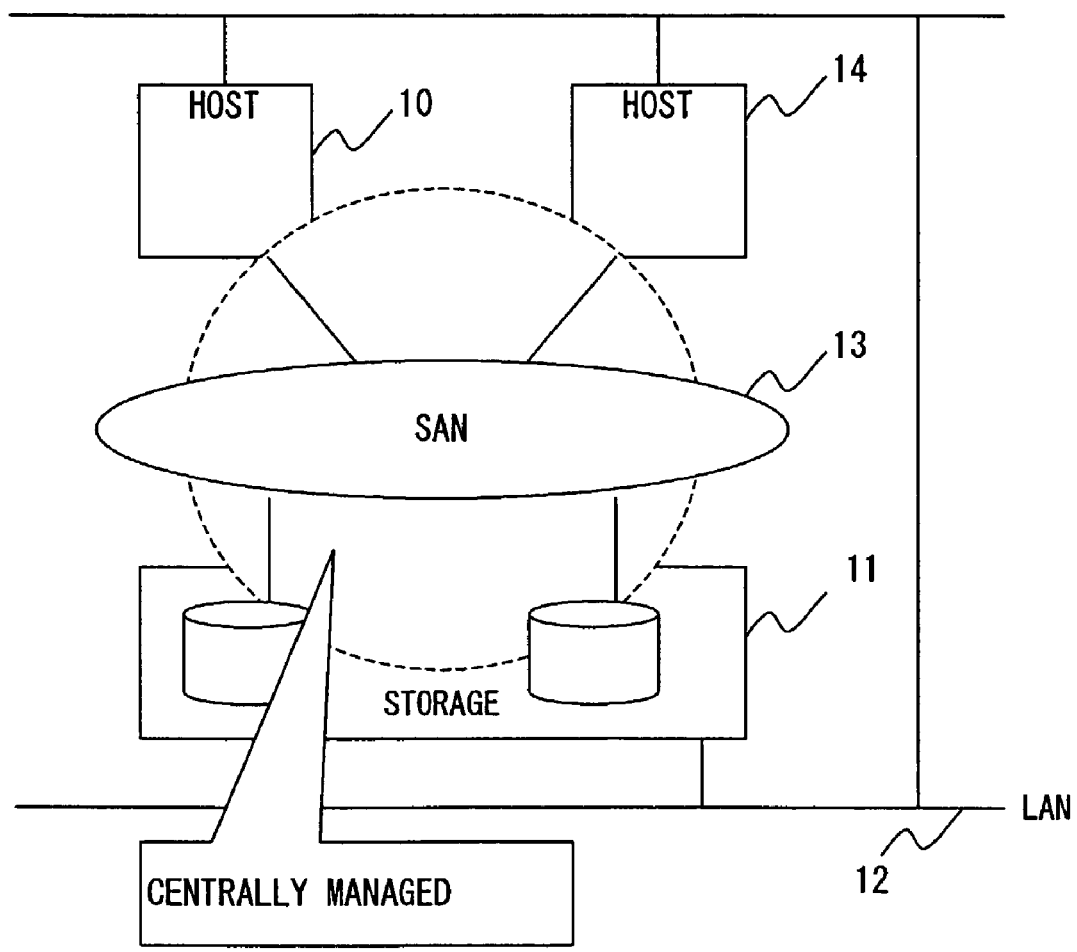
F I G. 3

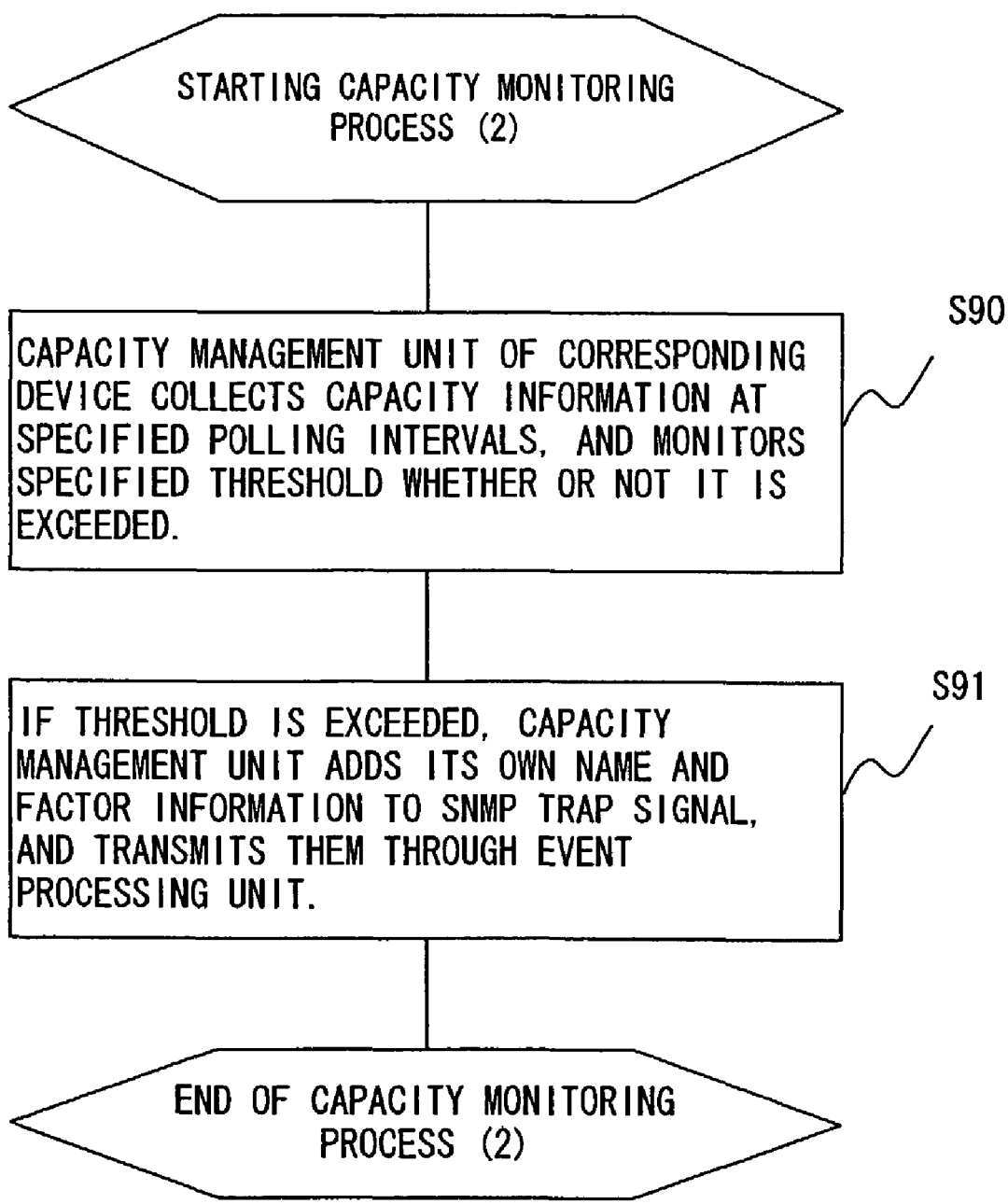
F I G. 3 0

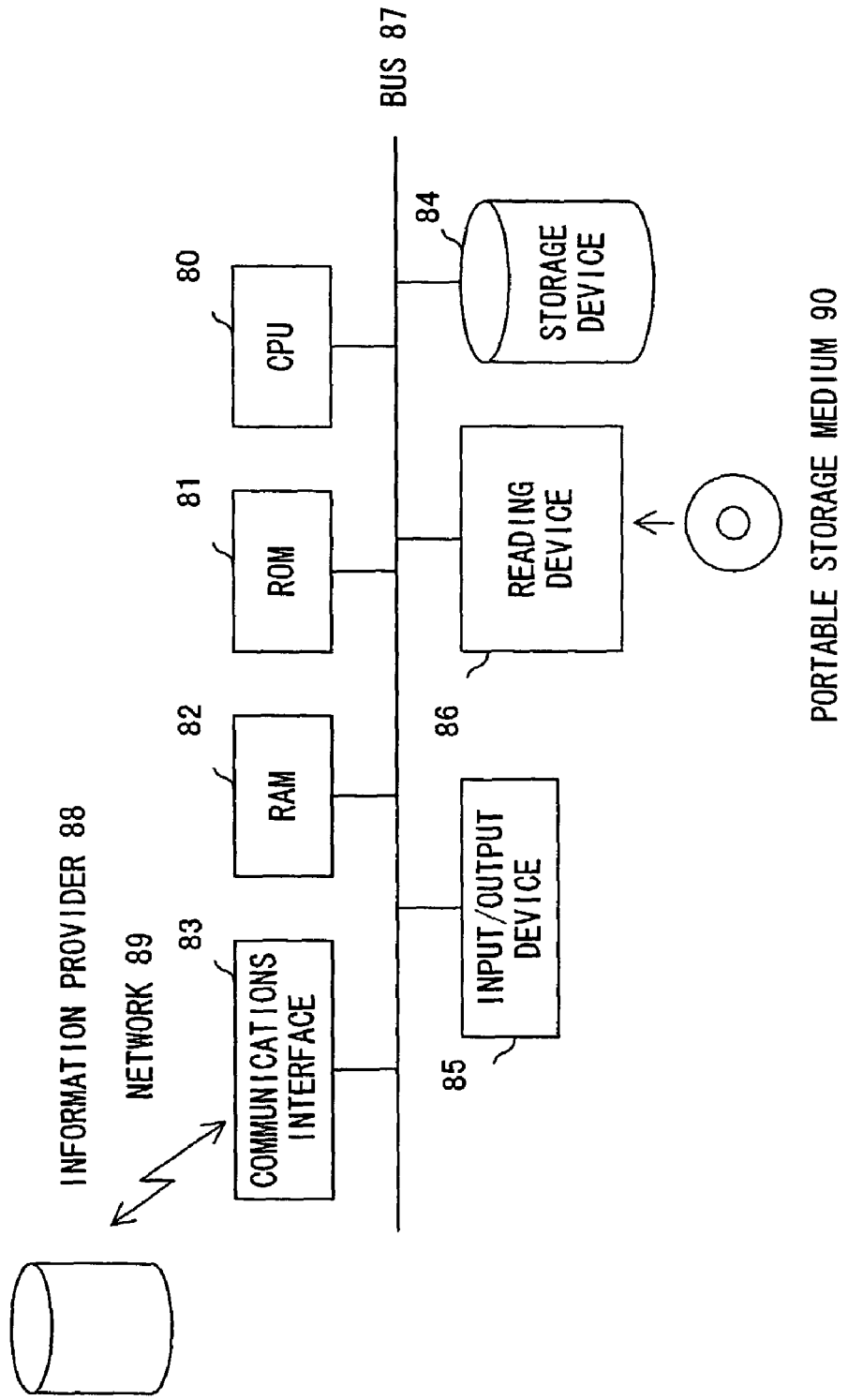
F I G. 32

COMPUTER SYSTEM FOR CENTRAL MANAGEMENT OF ASSET INFORMATION

BACKGROUND OF THE INVENTION

1. Field of the Invention

The present invention relates to an asset management system in a computer system, and more specifically to a computer system for central management of assets to which a plurality of host computers and a plurality of disk array devices are connected using a fiber channel, etc.

2. Description of the Related Art

In the conventional asset management system in a computer system, information stored in each device such as a host computer, a network storage, etc. is partially managed, and the partial information is combined with another piece of partial information by, for example, a system manager, thereby associating each piece of information with other pieces of information.

FIG. 1 shows a conventional asset managing method. In FIG. 1, when a host 101 and storage 103 are configured as a system in one vendor (including an OEM) as indicated by A, the information about each device can be managed in a unique format. However, in the system configuration in which a host vendor such as B and a storage vendor such as C coexist, information is managed in a format unique for each vendor, and the information cannot be associated with each other in a unique format, thereby requiring a person functioning as interface and combining plural pieces of information in unique formats.

Furthermore, in a system in which a plurality of host computers are connected to a plurality of disk array devices through a fiber channel, there are various vendor devices in the computer system although storage is centralized. The vendor devices can have different OS (operating systems). Therefore, each operating system has its own data format and accessing method from host to storage. As a result, it has been difficult to know which assets are used by which host computer, OS, or application. In addition, in case trouble occurs with certain assets, it has been difficult to know on which OS or application the trouble has an influence.

SUMMARY OF THE INVENTION

The present invention has been developed to solve the above mentioned problems, and aims at realizing central management of assets in a computer system by a management server in the system centrally managing all asset information in the system using a unique data structure, managing the centrally managed information associated corresponding to the unique data structure.

A computer system according to the present invention in which one or more host computers are connected to one or more hardware devices has a management server for managing assets in the system. Each of the one or more host computers includes an agent unit for notifying the management server of the information about the assets in the device corresponding to a request from the management server in a predetermined data structure, each hardware device includes an assets information notification unit for notifying the management server of the information about the assets in the device corresponding to a request from the management server in a predetermined data structure, and the management server includes an information management unit for managing the information given by the agent unit and the assets information notification unit as associated corresponding to the predetermined data structure.

According to the present invention, since data can be centrally managed in a format of associating assets in the entire system with each other, it can be easily understood first that which asset is used by which application, and it can be easily understood second that the trouble of which asset influences which application.

BRIEF DESCRIPTION OF THE DRAWINGS

FIG. 3 is a block diagram of the basic configuration of the computer system according to the present invention;

FIG. 30 is a flowchart of a capacity monitoring process (2);

FIG. 32 shows loading a program to a computer for realizing the present invention.

DESCRIPTION OF THE PREFERRED EMBODIMENT

The embodiments of the present invention are described below by referring to the attached drawings.

Figure 1:
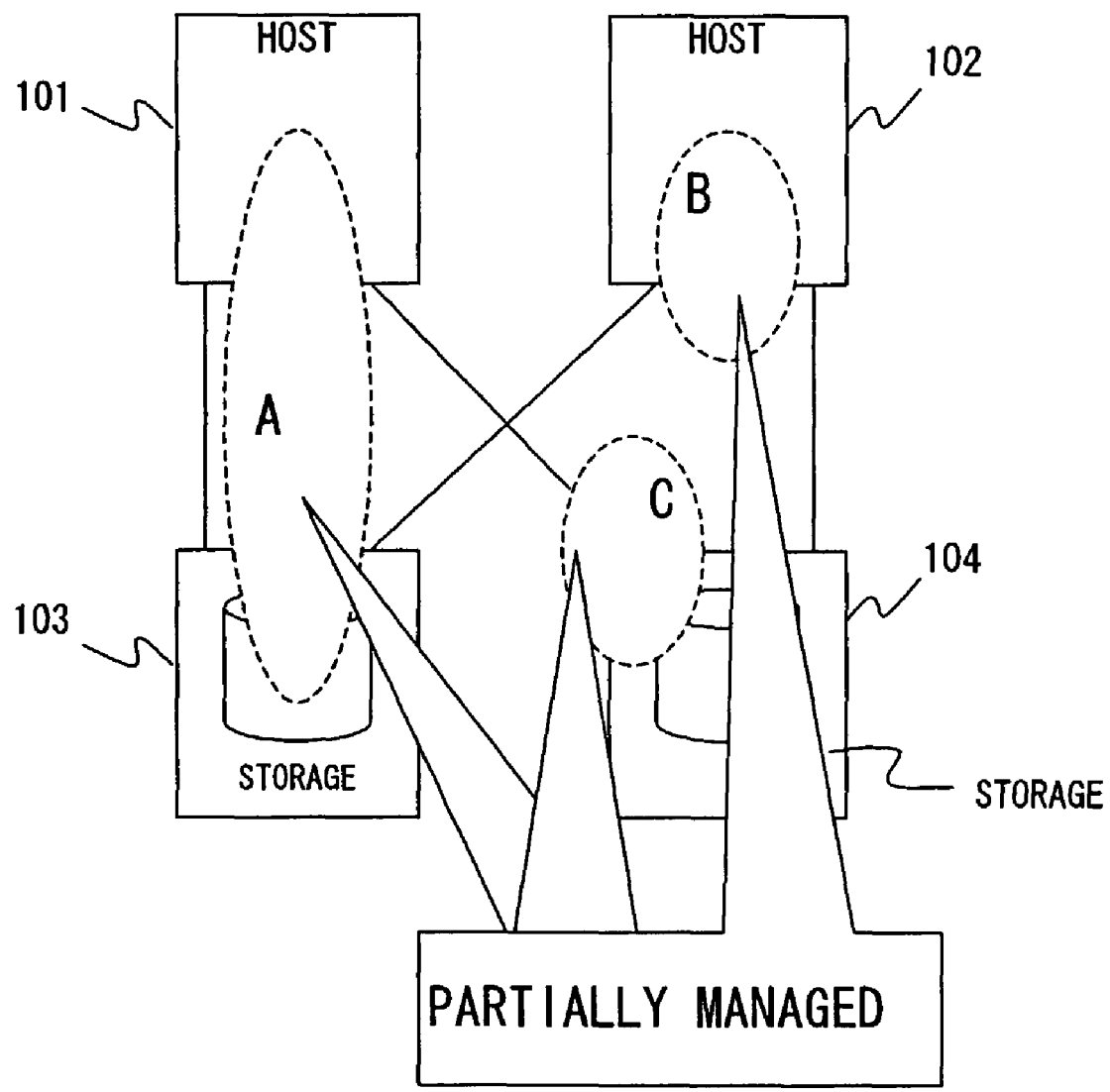
FIG. 1 shows the conventional assets management system in a computer system.
Figure 2:
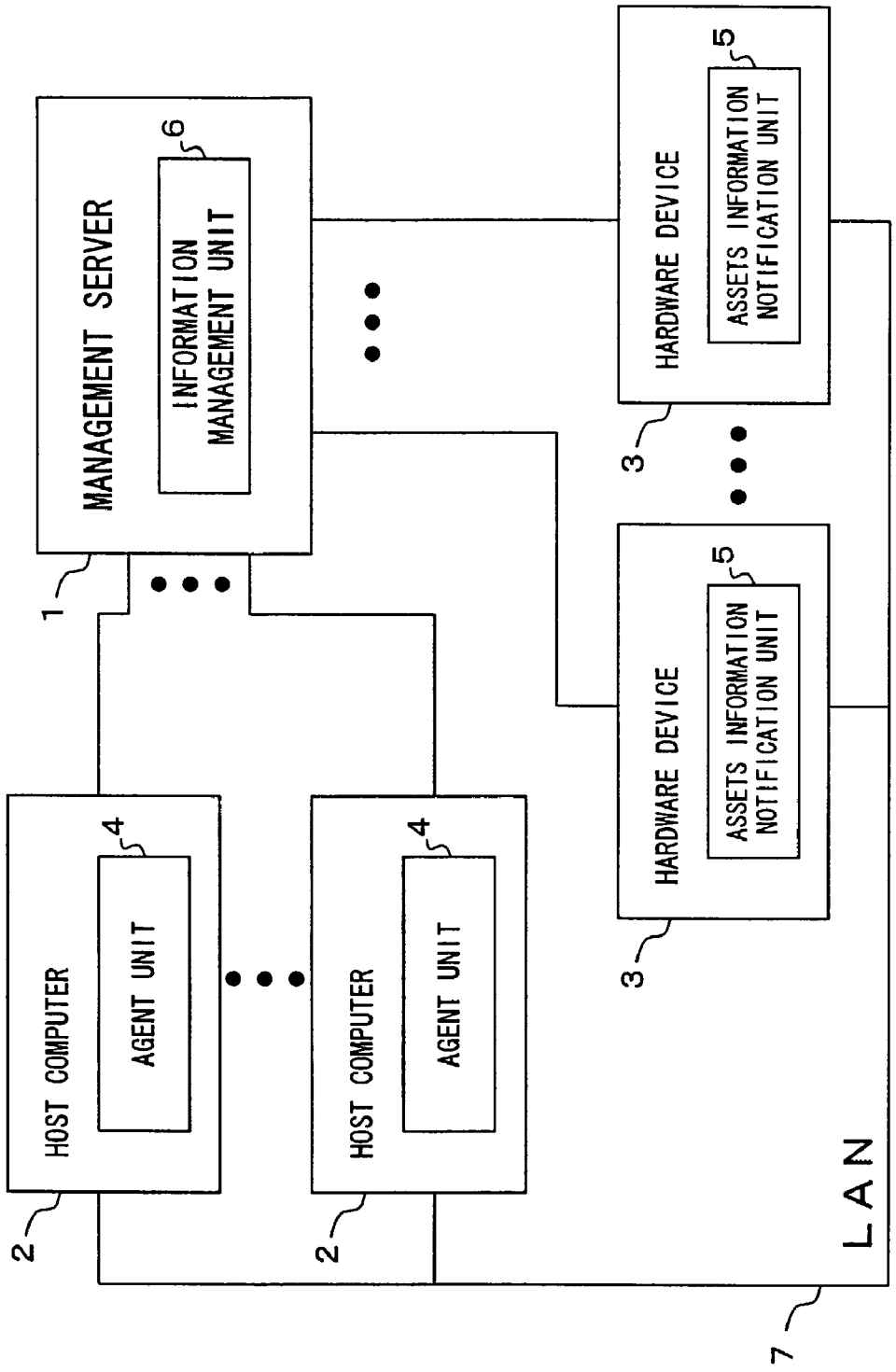
FIG. 2 is a block diagram showing the principle of the present invention.

FIG. 2 is a block diagram showing the principle of the present invention. Practically, FIG. 2 is a block diagram showing the principle of a computer system comprising one or more host computers 2, one or more host computers 2, and one or more hardware devices 3 connected through, for example, a local area network (LAN) 7, and further comprising a management server 1 for managing assets in the system.

In FIG. 2, each host computer 2 comprises an agent unit 4. The agent unit 4 receives a request from the management server 1, and notifies the management server 1 of the information about the assets in the computer, that is, in the device to which the agent unit 4 belongs according to a predetermined data structure.

Each hardware device 3 comprises an assets information notification unit 5. The assets information notification unit 5 receives a request from the management server 1, and notifies the management server 1 of the information about the assets in the device to which the assets information notification unit 5 belongs according to a predetermined data structure.

The management server 1 comprises an information management unit 6. The information management unit 6 associates the information received from the agent unit 4 in each host computer 2 and the assets information notification unit 5 in each hardware device 3 with the predetermined data structure and manages the information.

According to the present invention, the predetermined data structure includes an area for storing data indicating what are higher assets and lower assets viewed from the assets in the system.

In FIG. 2, each host computer 2 and hardware device 3 can comprise a trouble management unit. The trouble management unit notifies the management server 1 of the information about trouble each time trouble occurs in the device to which the trouble management unit belongs, and of trouble sign information each time the device enters a state of a trouble sign.

In this case, when the information management unit 6 of the management server 1 receives the information about trouble or the trouble sign information, it increments the count value for the corresponding device. When the count value exceeds a threshold, the information management unit 6 sets in an error state the information about all assets associated with the information about the assets of the device about which asset trouble information or trouble sign notification has been given in the information associated with the predetermined data structure.

In FIG. 2, each host computer 2 and hardware device 3 can comprise a performance management unit for monitoring the performance of the device to which the host computer 2 or the hardware device 3 belongs, and the management server can comprise a system performance management unit for managing the performance of the entire system. In this case, the system performance management unit of each device collects the performance information about the device at a request of the management server, transmits the information to the management server. The system performance management unit associates the information about the assets of the device which has transmitted the performance information with the information about other assets associated by the above mentioned information management unit, thereby managing the performance of the entire system.

Furthermore, in FIG. 2, each host computer 2 and hardware device 3 can comprise a capacity management unit for managing the capacity of the assets in the device each of them belongs, and the management server can comprise a system assets capacity management unit for managing the capacity of the assets in the entire system. In this case, the capacity management unit of each device monitors whether or not the capacity of the assets of the device to which it belongs has exceeded a threshold at a request of the management server. If the capacity has exceeded the threshold, then the management server is notified of it, and the system assets capacity management unit sets in an error state the status of the information about the assets related to the assets whose threshold has been exceeded in the notification in the information associated with the above mentioned predetermined data structure.

In the program used by the management server 1 shown in FIG. 2, a program is used to direct a computer to perform the procedure of receiving the information about the assets of each device according to the data structure predetermined by each host computer and each hardware device in the system, and the procedure of associating the received information with the predetermined data structure. In FIG. 2, a computer-readable portable storage medium storing the program can also be used.

As described above, according to the present invention, the information about each asset is centralized in the management server based on the data structure predetermined in the system, and the management server associates the information about the centralized assets based on the predetermined structure.

Described below in more detail are the embodiments of the present invention.

FIG. 3 is a block diagram of the configuration showing the principle of the computer system according to the present invention. In FIG. 3, storage 11 used by a plurality of hosts 10 and 14 is centralized, the host 10 is connected with the storage 11 through a local area network (LAN) 12, and the storage 11 is managed by a server (not shown in the attached drawings) of a storage area network (SAN) 13 for link to a storage device.

In the system shown in FIG. 3, different operating systems can be used. For example, the OS (operating system) of the host 10 is Windows (registered trademark) of Microsoft, the OS of the host 14 is UNIX system (UNIX (registered trademark), Linux, Solaris, etc.), etc. One storage 11 can be shared between the hosts 10 and 14 which use different operating systems.

Figure 4:
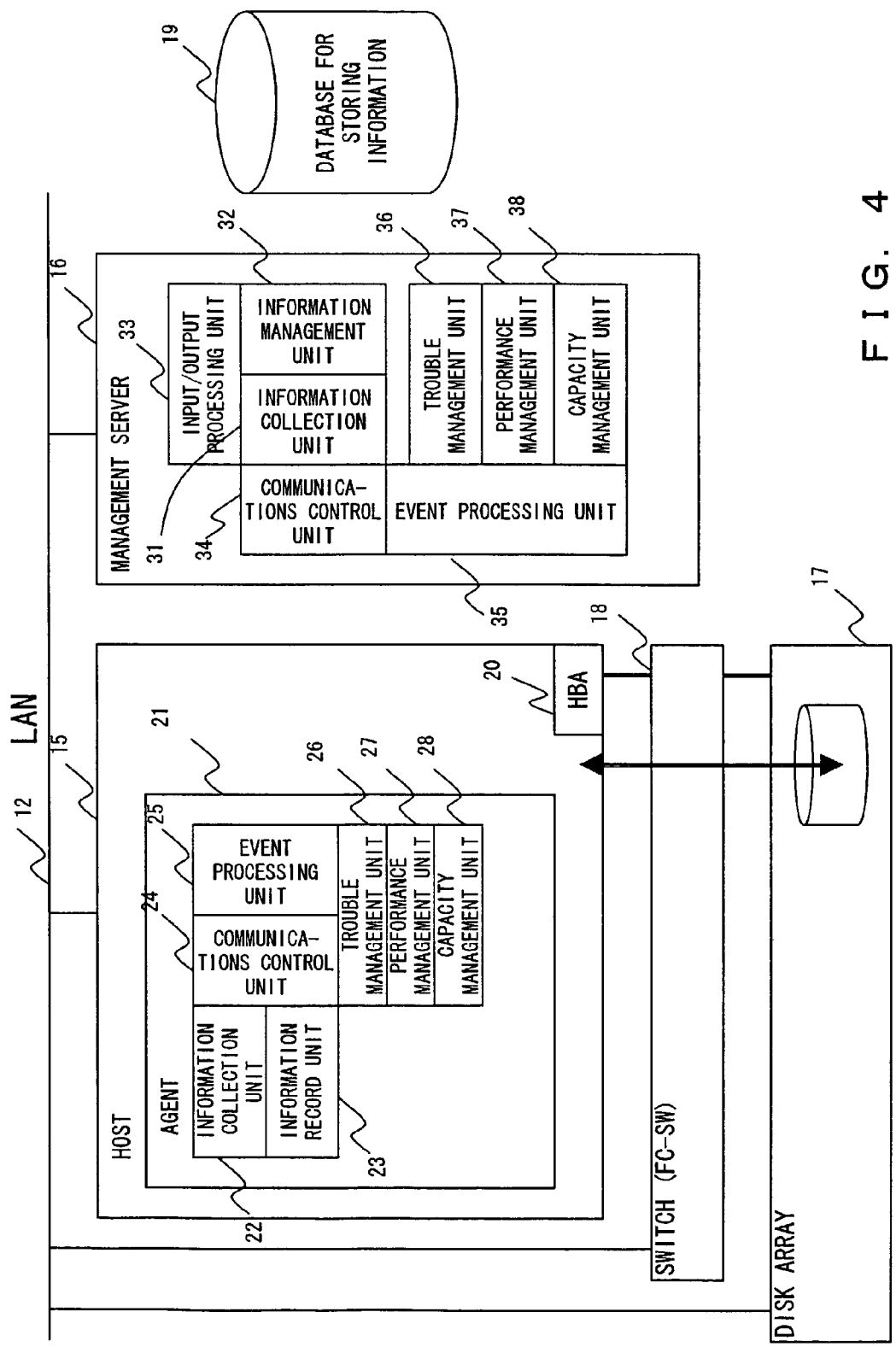
FIG. 4 is a block diagram of the configuration of the computer system according to an embodiment of the present invention.

FIG. 4 is a block diagram of the configuration of a computer system configured by hardware such as a plurality of hosts and disk arrays, etc. In FIG. 4, only one host 15 is shown, but basically a plurality of hosts 15 are assumed in the system.

The computer system shown in FIG. 4 comprises the host 15, a management server 16, a disk array 17, a switch (FC-SW) 18 connected through a fiber channel, and a database 19 for storing information to be used by the management server 16. The host 15 includes a host bus adapter (HBA) 20 for access to the disk array.

The host 15 comprises an agent 21 for centrally managing the computer assets according to the present embodiment, and the agent 21 comprises an information collection unit 22, an information record unit 23, a communications control unit 24, an event processing unit 25, a trouble management unit 26, a performance management unit 27, and a capacity management unit 28.

The management server 16 also comprises, almost corresponding to the configuration of the agent 21, an information collection unit 31, an information management unit 32, an input/output processing unit 33, a communications control unit 34, an event processing unit 35, a trouble management unit 36, a performance management unit 37, and a capacity management unit 38.

Figure 5:
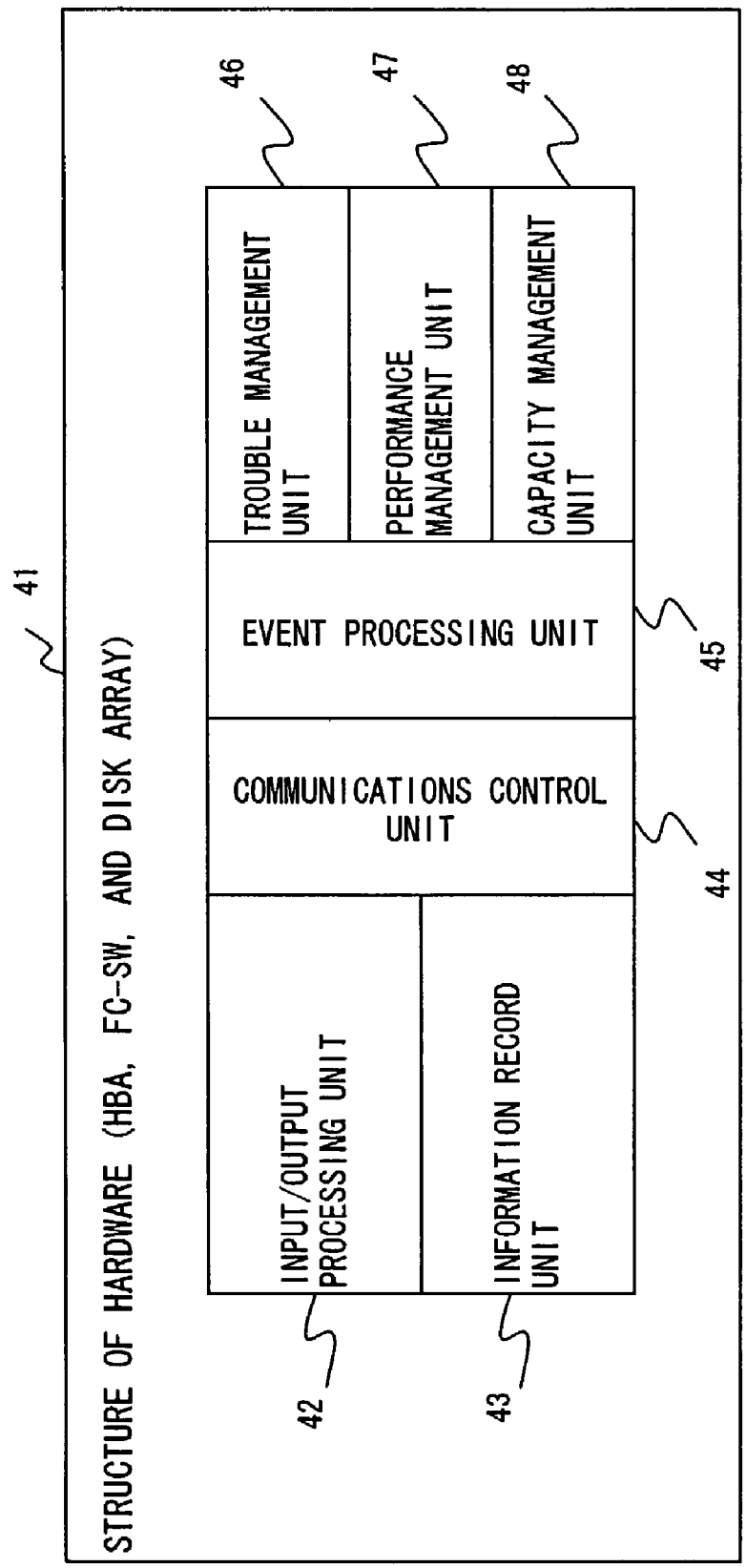
FIG. 5 shows the configuration for centrally managing assets in the hardware device shown in FIG. 3.

FIG. 5 shows the structure of a portion for centrally managing the assets in the hardware according to the present embodiment such as the disk array 17, the switch 18, the host bus adapter 20, etc.

That is, almost corresponding to the structure of the agent 21 and the management server 16, hardware 41 comprises an input/output processing unit 42, an information record unit 43, a communications control unit 44, an event processing unit 45, a trouble management unit 46, a performance management unit 47, and a capacity management unit 48.

Figure 6:
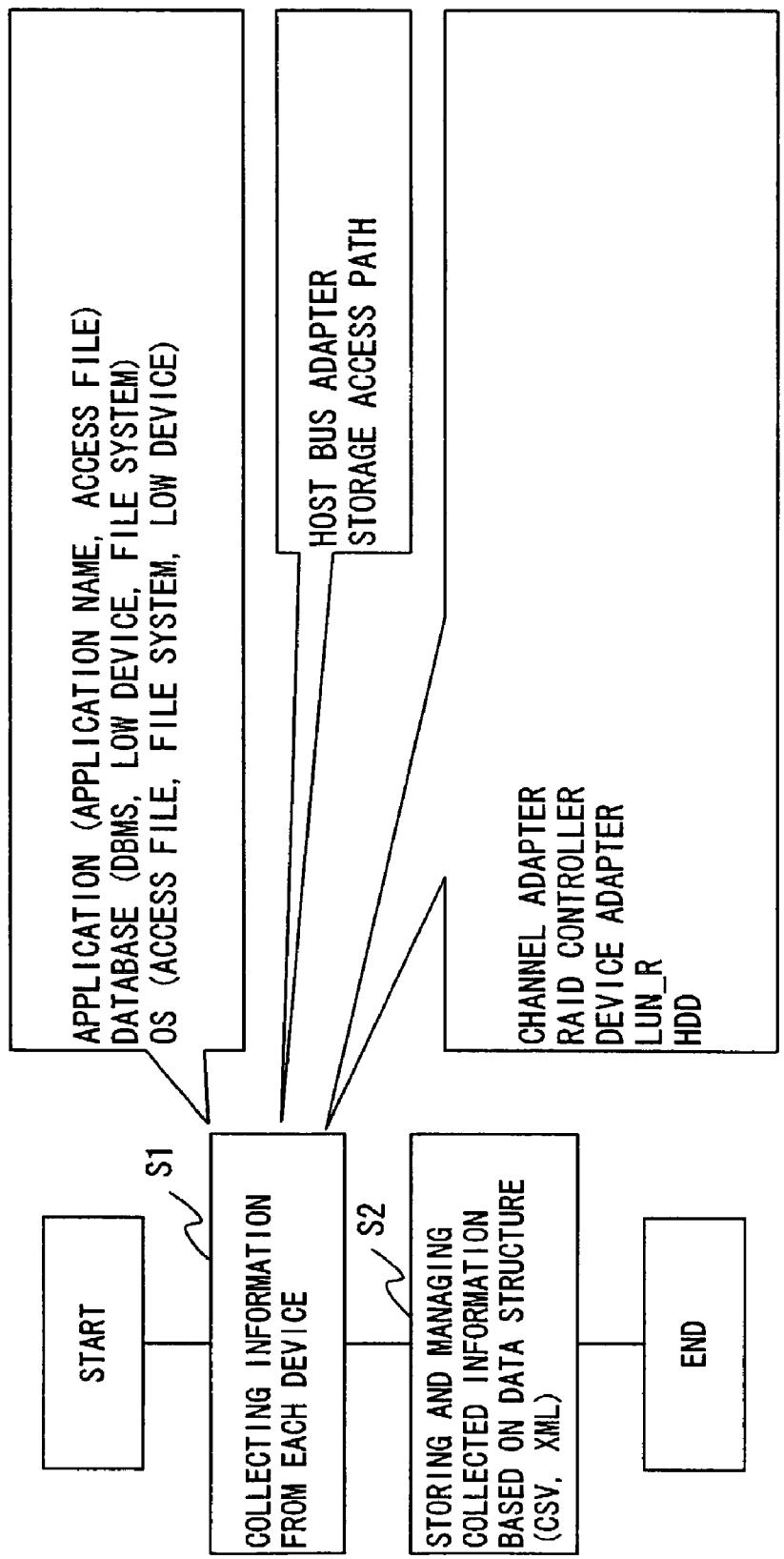
FIG. 6 is a basic flowchart of the information collecting process according to an embodiment of the present invention.

FIG. 6 is a basic flowchart of the information collecting process for the central management of assets. When the process starts as shown in FIG. 6, information is first collected in step S1. The assets collected by the agent 21 of the host 15 can be an application, that is, an application name and an access file, a database management system (DBMS) related to a database, a low device as a lower device in the host, and a file system, and an access file, a file system, and a low device related to the operating system (OS).

The assets which function as an intermediate path between the host 15 and the disk array 17 can be a host bus adapter and a storage access path including the switch 18.

In addition, the assets of the disk array 17 can be a channel adapter, a RAID (redundant array of inexpensive disk) controller, a device adapter, a logic unit (LUN-R, corresponding to physical layer), and a hard disk drive (HDD).

The agent 21 of the host 15 performs a process of collecting information by issuing a command corresponding to each OS when different OSs are used among a plurality of hosts. Then, the obtained information is converted into the same information format for central management by the management server 16, that is, into a unique information format specific to the system of the present invention, and the converted information is transmitted to the management server 16. Thus, although different OSs are used among the hosts 15 using the disk array 17 (storage 11), the management server 16 can collect the information in the same format from each host 15 having a different OS.

In FIG. 6, when information from each device is collected in step S1, the collected information is stored and managed in the data structure specific to the embodiment of the present invention, that is, in the data-related format such as a CSV (comma separated value), an XML (extensible markup language), etc. in step S2, thereby terminating the process.

Figure 7:
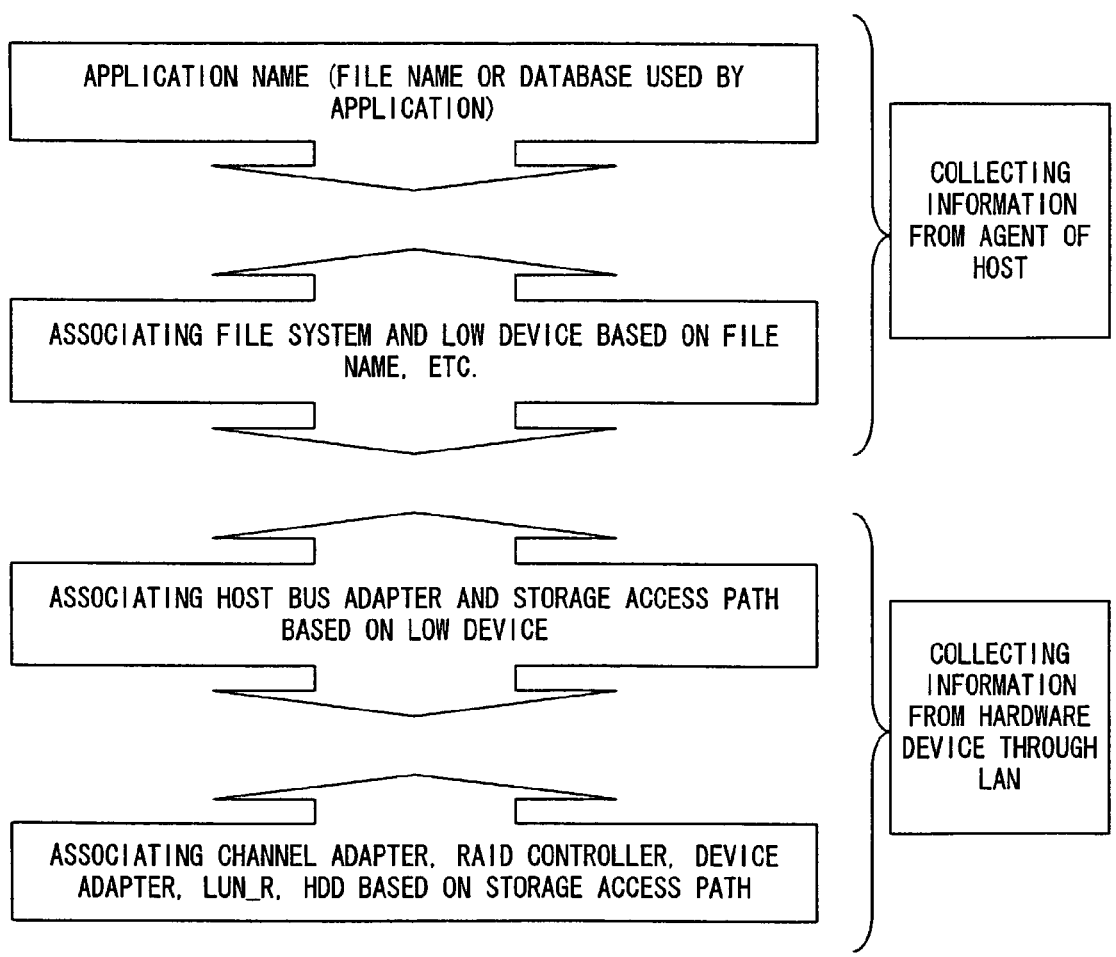
FIG. 7 is a view of associating asset data according to an embodiment of the present invention.

FIG. 7 shows the data structure according to the present invention, that is, the relationship among asset data. In FIG. 7, the relationship is defined among the assets from a higher layer among, for example, in the hosts 15.

In FIG. 7, an application name in the host, that is, a file name or the assets of a database, is associated with the file system and low device as lower assets using a file name, etc. The data about the assets is collected by the agent 21 of the host 15.

In FIG. 7, the data of the host bus adapter and the storage access path as assets lower than the low device is associated with the low device, and a further lower channel adapter, RAID controller, device adapter, LUN-R, and HDD are associated with the storage access path. The data about these assets is collected from the hardware device, for example, the disk array 17, through the LAN.

Figure 8:
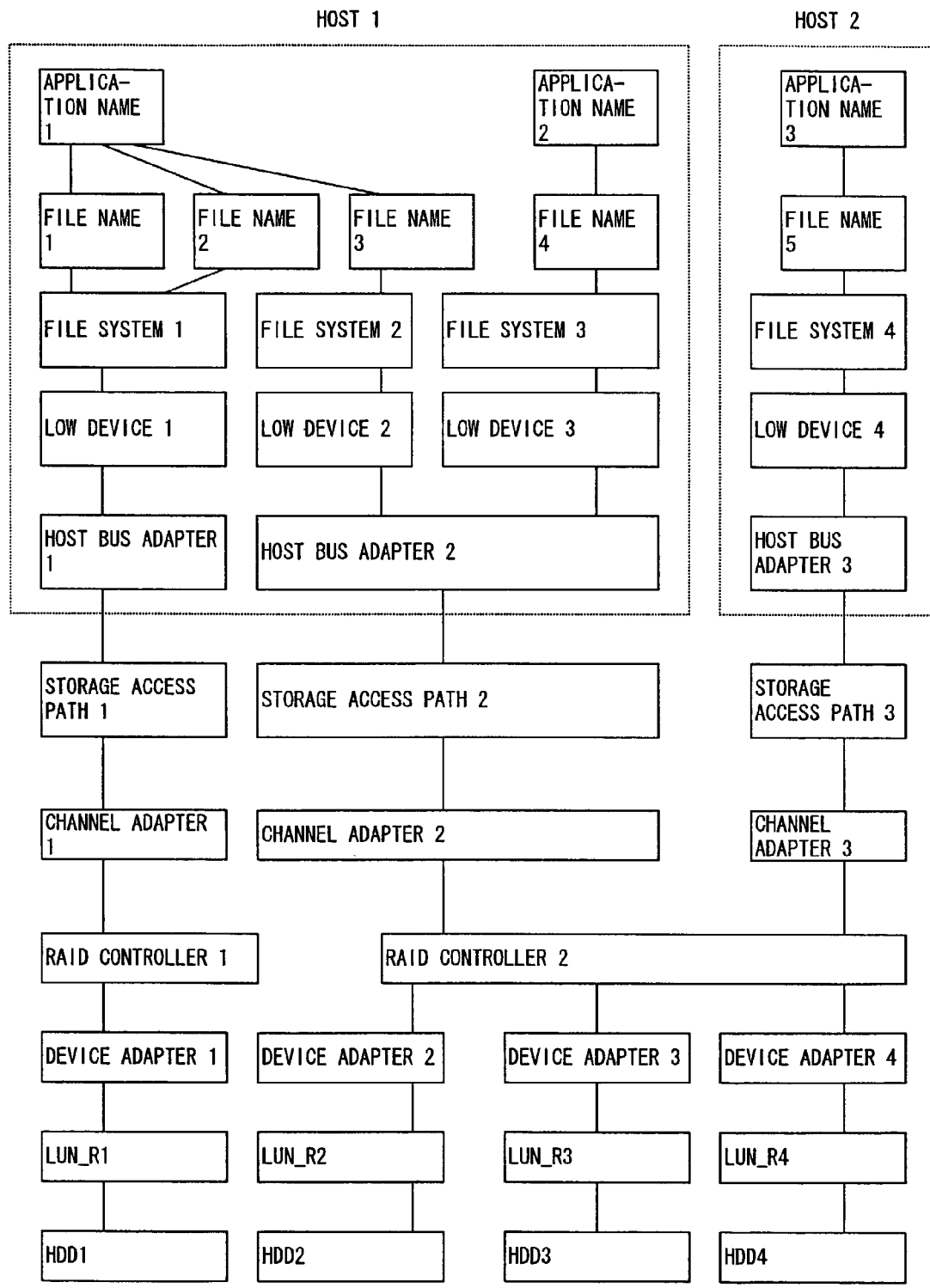
FIG. 8 shows the entire data structure according to an embodiment of the present invention.

FIG. 8 shows the data structure according to the present embodiment, that is, the relationship of the data about assets. In FIG. 8, there are two hosts, that is, a host 1 and a host 2. In the host 1, two applications having an application name 1 and an application name 2 are operated. In the host 2, an application having an application name 3 is operated. Under each application, the data about the assets of a file name, a file system, a low device, a host bus adapter, a storage access path, a channel adapter, an RAID controller, a device adapter, an LUN-R, and an HDD is associated as shown in FIG. 8.

Figure 9:
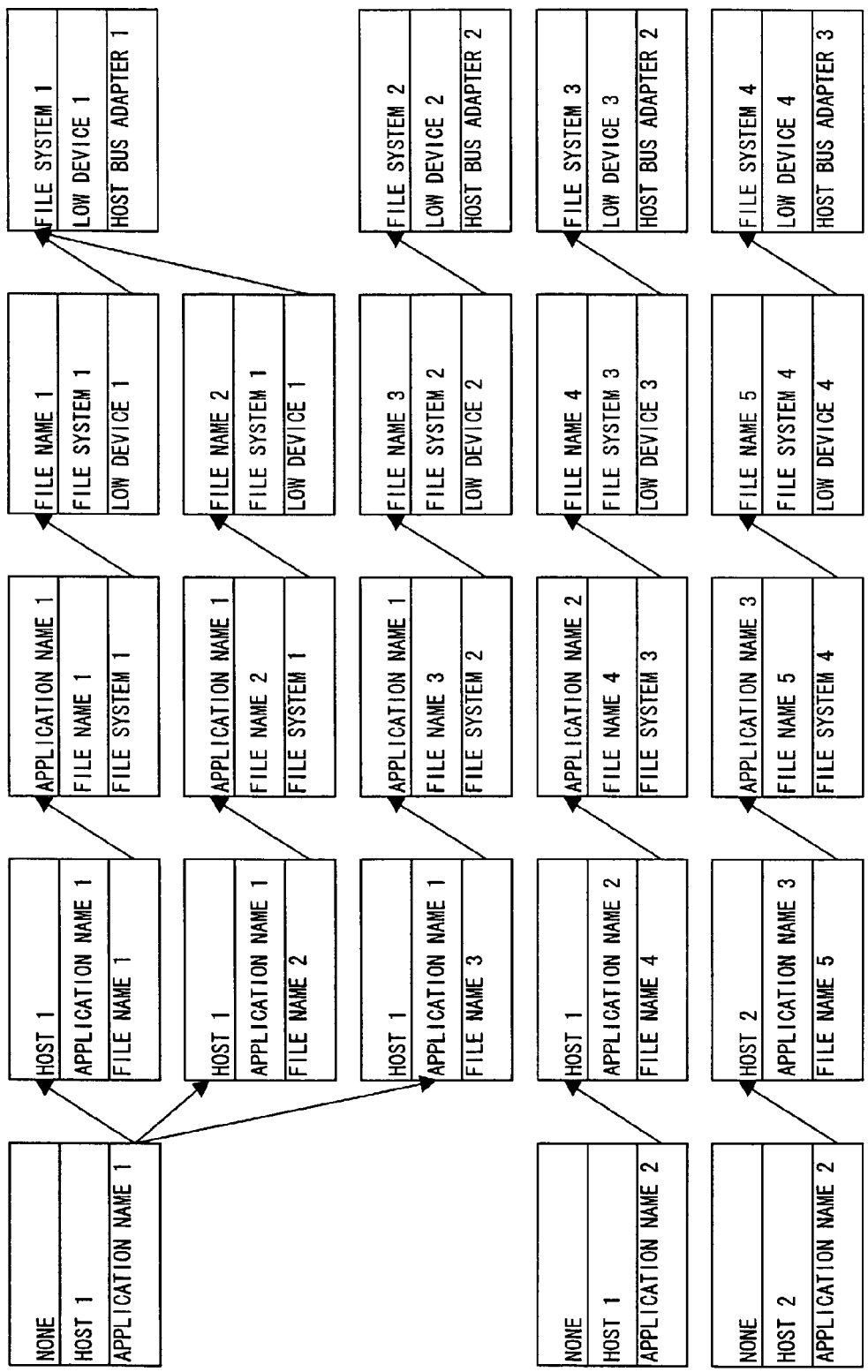
FIG. 9 shows detailed data structure (1) according to an embodiment of the present invention.
Figure 10:
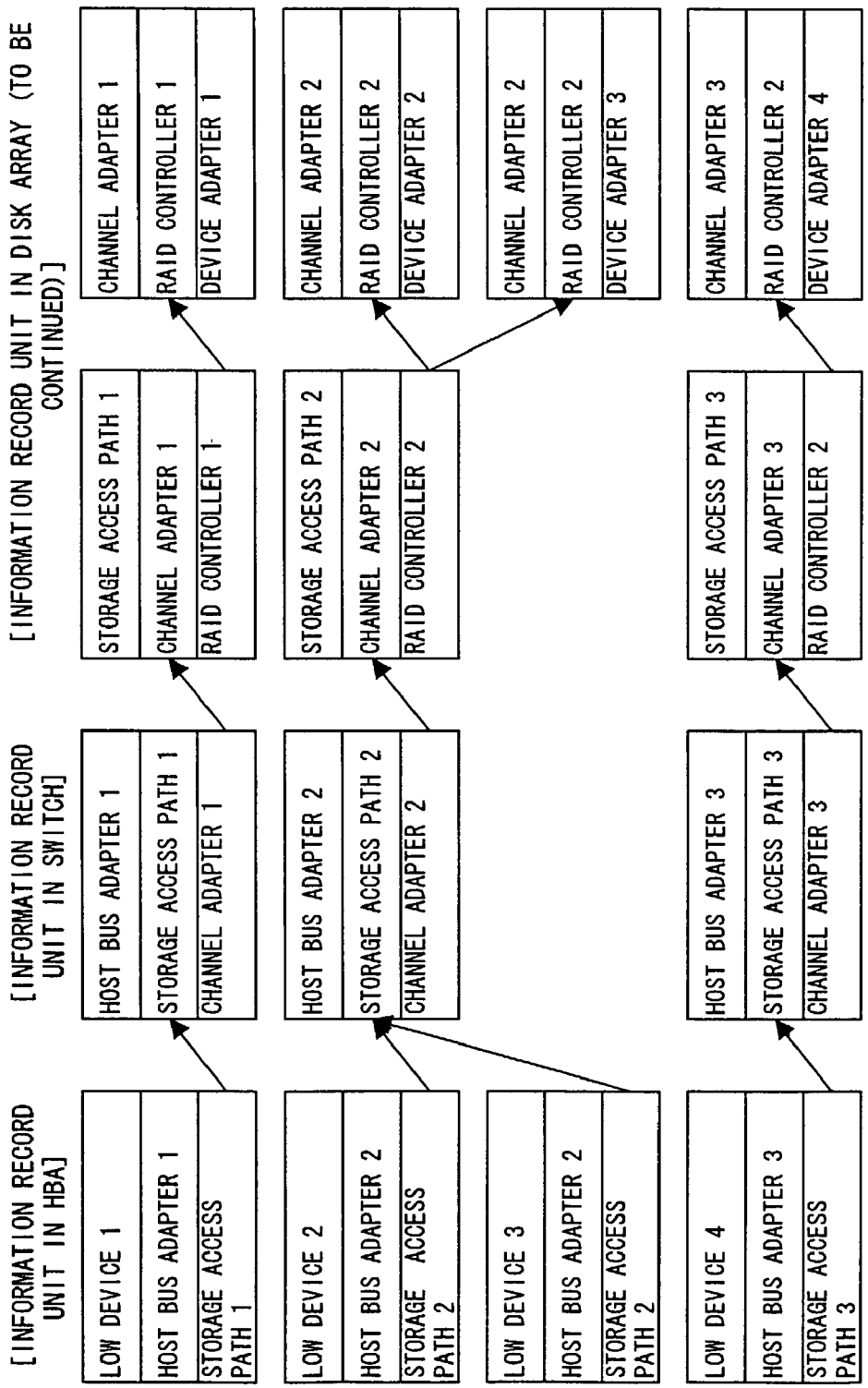
FIG. 10 shows detailed data structure (2) according to an embodiment of the present invention.
Figure 11:
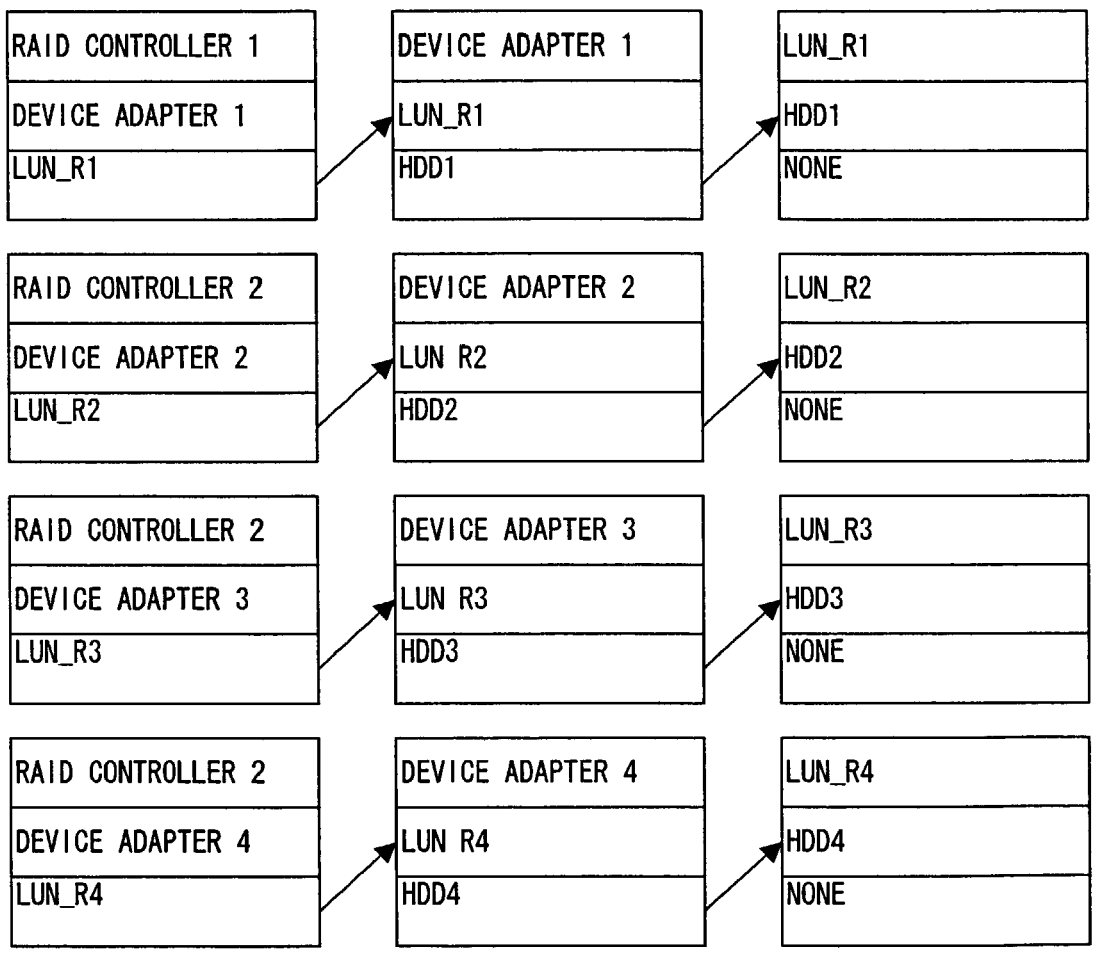
FIG. 11 shows detailed data structure (3) according to an embodiment of the present invention.

FIGS. 9 through 11 show in detail the data structure shown in FIG. 8, that is, the relationship of data. FIG. 9 shows the relationship of the data recorded by the information record unit 23 in the agent 21 shown in FIG. 4. In FIG. 9, for example, three most significant pieces in two types of data having the application name 1 in the center and having the application name 1 or 2 below each application name are recorded.

Among the data, the higher column describing 'none' indicates that there are no higher assets of the host 1. For example, the 'application name 1' has the assets of the application name 1 as lower asset of the host 1. On the other hand, there is only one piece of data of the host 2 having the lower assets of the application name 3.

Although the data of the host 1 has the lower asset of the application name 1. In FIG. 8, since the application name 1 has the lower assets of the three files having the file names 1, 2, and 3, there are three pieces of data for the application name 1, and there are a higher host 1 and three file assets of the file names 1, 2, and 3 as indicated by upper and lower columns of each piece of data and arrows. Similarly, FIG. 9 shows the relationship among the data managed by the information record unit 23 in the agent.

FIG. 10 shows the relationship between a part of the data managed by the information record units of the host bus adapter 20 and the switch 18 shown in FIG. 4, and the data managed by the information record unit of the disk array 17.

In FIG. 10, for example, the higher asset of the host bus adapter is a low device 1, and its lower asset is a storage access path 1, the higher asset of the storage access path 1 is a host bus adapter 1, and its lower asset is a channel adapter 1, the higher asset of the channel adapter 1 is a storage access path 1, and its lower asset is a RAID controller 1, and the higher asset of the RAID controller 1 is a channel adapter 1, and its lower asset is a device adapter 1 as indicated by the upper and lower columns of each piece of data and arrows.

FIG. 11 shows the portion continuing from FIG. 10 among the data managed by the information record unit 43 in the disk array 17. In FIG. 11, for example, the higher asset of the device adapter 1 is the RAID controller 1, and its lower asset is the LUN-R1, the higher asset of the LUN-R1 is the device adapter 1, and its lower asset is the HDD 1, and the higher asset of the HDD 1 is the LUN-R1, and there is no lower asset of the HDD 1 as indicated by the arrows, etc.

Figure 12:
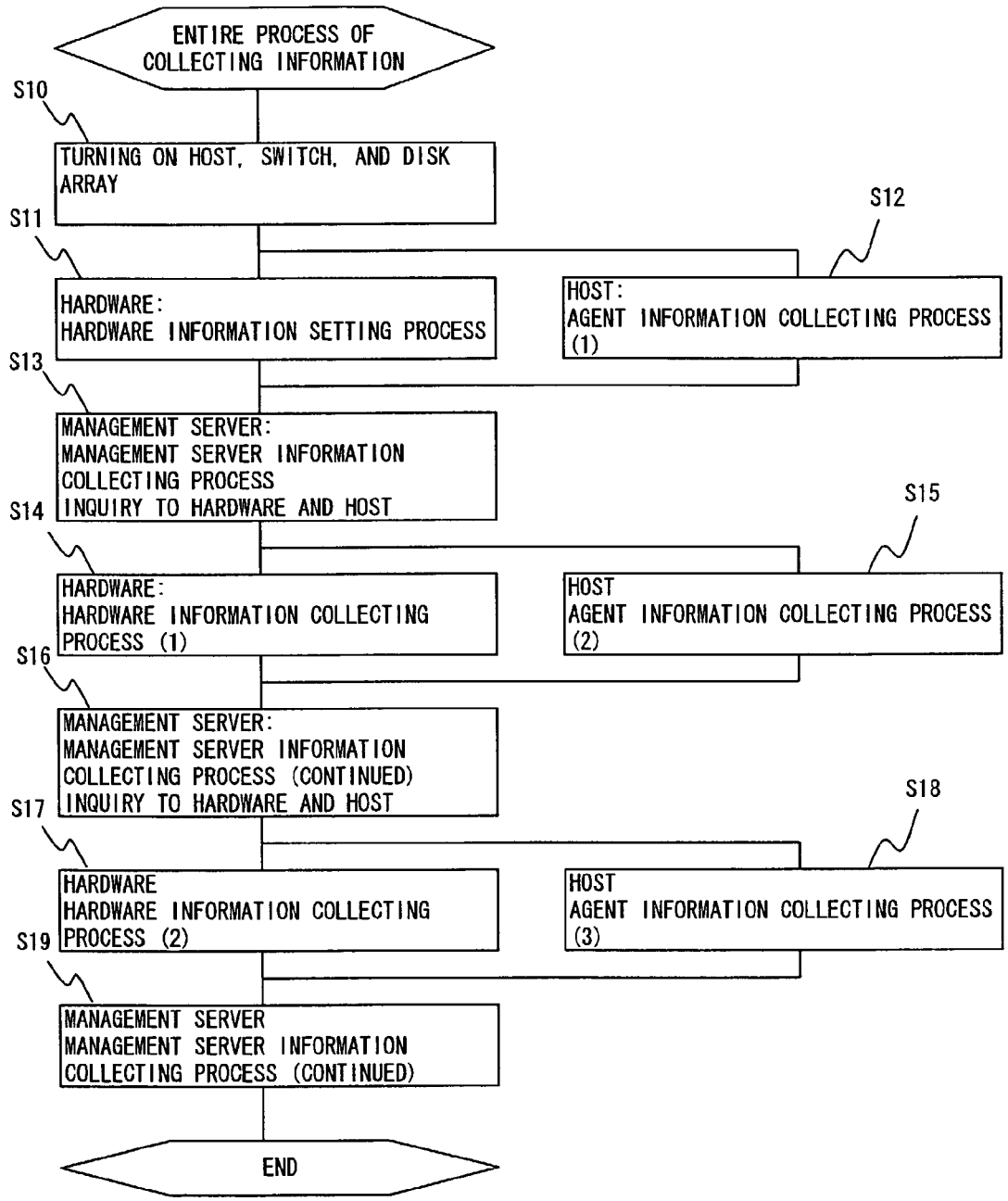
FIG. 12 shows an entire flowchart of an information collecting process.

FIG. 12 is a flowchart of the entire process of collecting information in the computer system according to the present embodiment. If the process starts as shown in FIG. 12, the host 15, the switch 18, and the disk array 17 are first powered on in step S10, and the hardware information setting process in the hardware is performed in step S11 simultaneously with the agent information collecting process (1) in the host 15. These processes are described later.

Then, in step S13, the management server information collecting process starts in the management server 16, it is inquired whether or not the information collection is supported for the hardware and the host as described later. In step S14, the hardware information collecting process (1) is performed in the hardware. In step S15, the agent information collecting process (2) is performed in the host. If the information collection is supported, the management server is notified of it.

Then, in step S16, the management server information collecting process is continued in the management server. In this process, an inquiry about the actual data, that is, an inquiry about detailed information, is issued to the hardware and the host supporting the information collection. In step S17, the hardware information collecting process (2) is performed in the hardware. In step S18, the agent information collecting process (3) is performed in the host, thereby providing detailed information for the management server. Then, in step S19, the management server information collecting process is continued in the management server, and the detailed information received from the host and the hardware is associated, thereby terminating the process.

Figure 13:
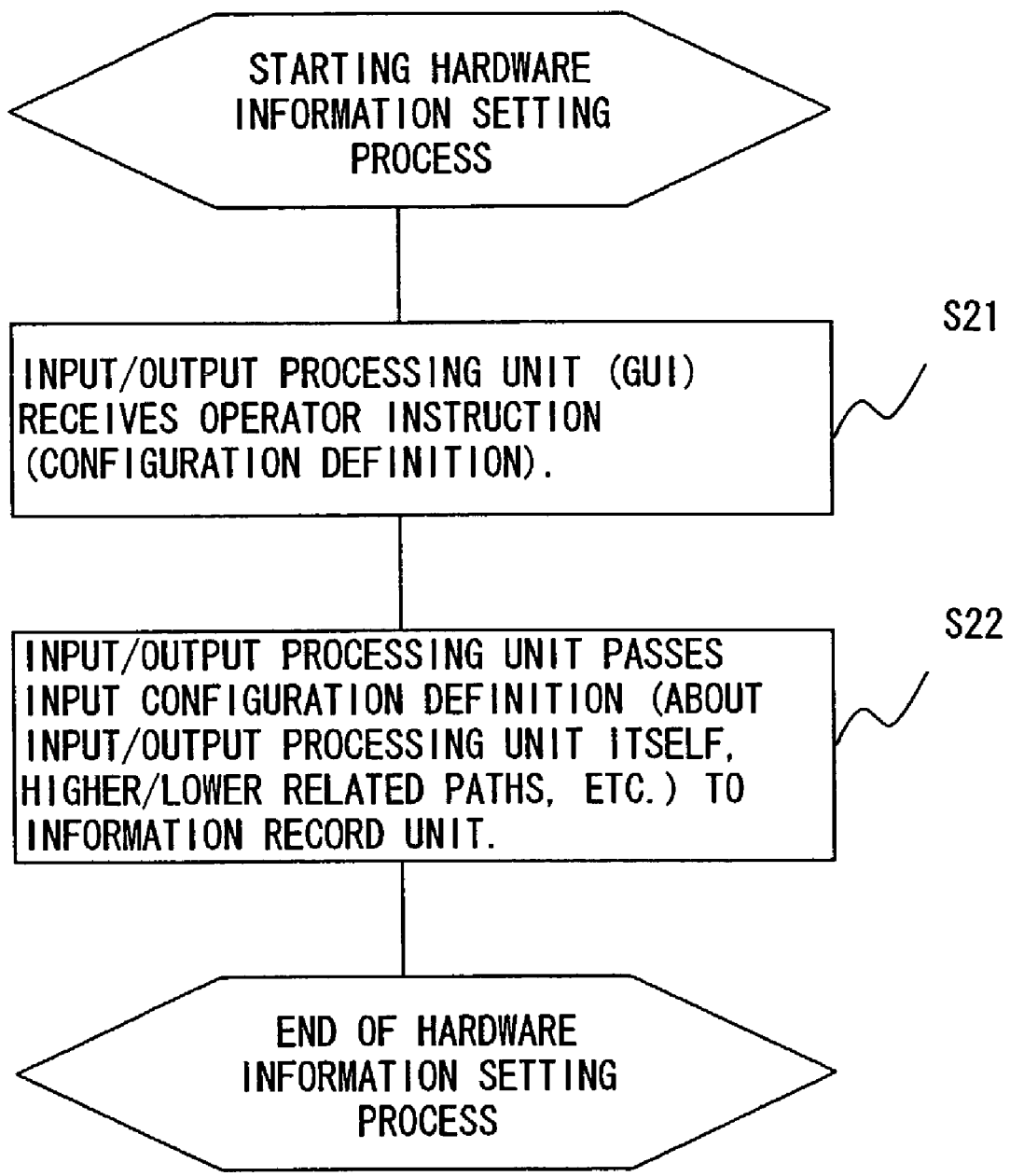
FIG. 13 is a flowchart of a hardware information setting process.

The detailed process in each step shown in FIG. 12 is further described below by referring to FIGS. 13 through 20. FIG. 13 is a detailed flowchart of the hardware information setting process in step S11. If the process starts as shown in FIG. 13, the input/output processing unit 42 in the hardware, for example, the graphic user interface (GUI), receives the definition of the configuration of the data as an instruction of the operator in step S21. In step S22, the definition of the configuration of the data input by the input/output processing unit 42, that is, the data such as the related path, etc. indicating the data and higher and lower assets, is transmitted to the information record unit 43, thereby terminating the process.

Figure 14:
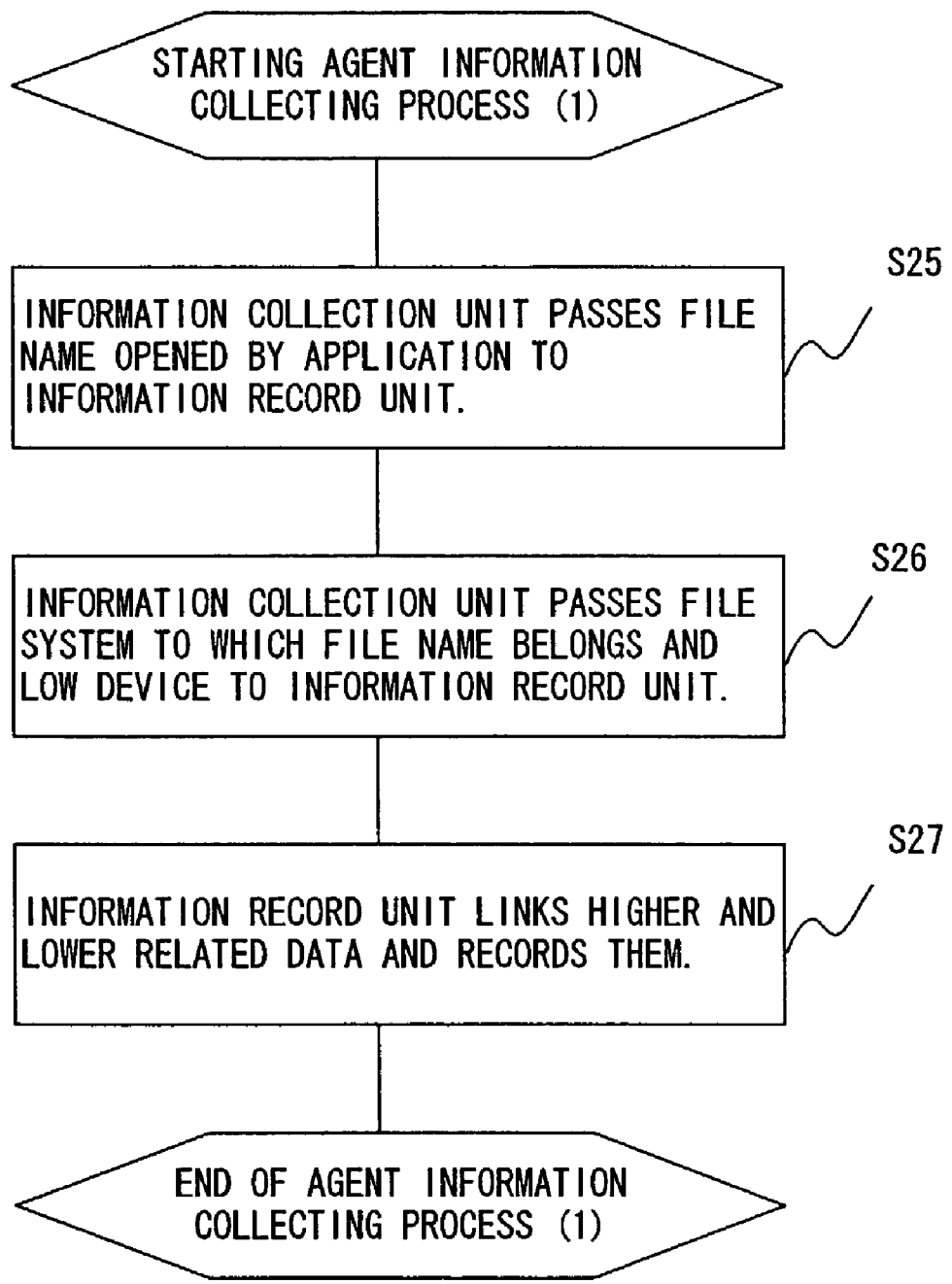
FIG. 14 is a flowchart of an agent information collecting process (1)

FIG. 14 is a detailed flowchart of the agent information collecting process (1) in step S12 shown in FIG. 12. When the process starts as shown in FIG. 14, first in step S25, the file name opened by the application is passed, and then in step S26, the file system to which the file name belongs and the low device as the lower asset are passed from the information collection unit 22 of the agent 21 in the host 15 shown in FIG. 4 to the information record unit 23. In step S27, the information record unit 23 associates the data with one another above and below, records the relationship among the data, thereby terminating the process.

Figure 15:
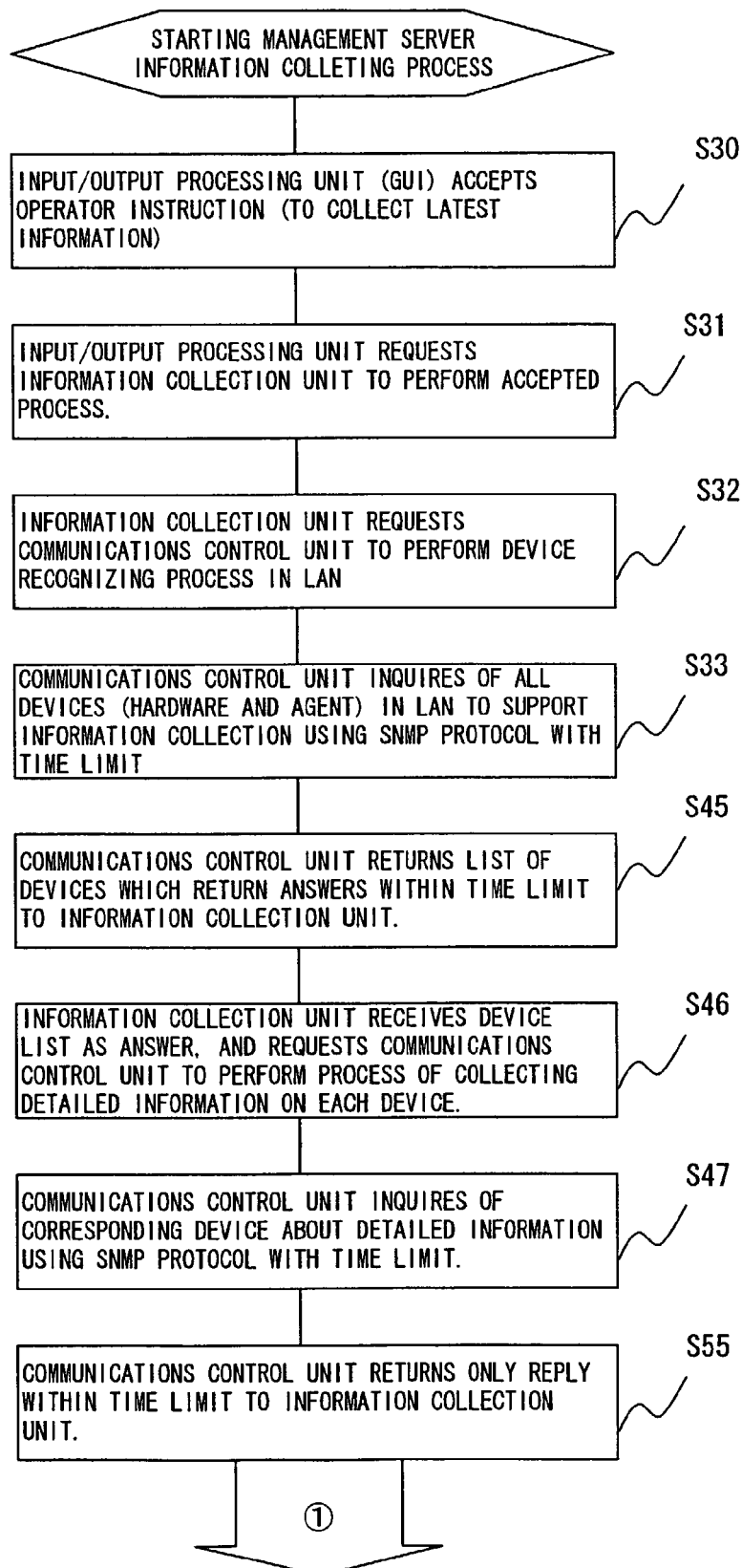
FIG. 15 is a flowchart (1) of a management server information collecting process.

Steps S30 through S33 shown in FIG. 15 show in detail the process in step S13 shown in FIG. 12. When the management server information collecting process starts, the input/output processing unit 33 of the management server 16 shown in FIG. 4, for example, the graphic user interface (GUI), accepts an instruction of the operator, that is, the instruction to collect the latest information in step S30. In step S31, the input/output processing unit 33 requests the information collection unit 31 to perform the collecting process. In step S32, the information collection unit 31 requests the communications control unit 34 to recognize the device in the LAN. In step S33, the communications control unit 34 asks all devices in the LAN, that is, the hardware and the agents in the host, whether or not the simple network management protocol (SNMP) supports the information collection for management of equipment in the TCP/IP network with a time limit.

Figure 17:
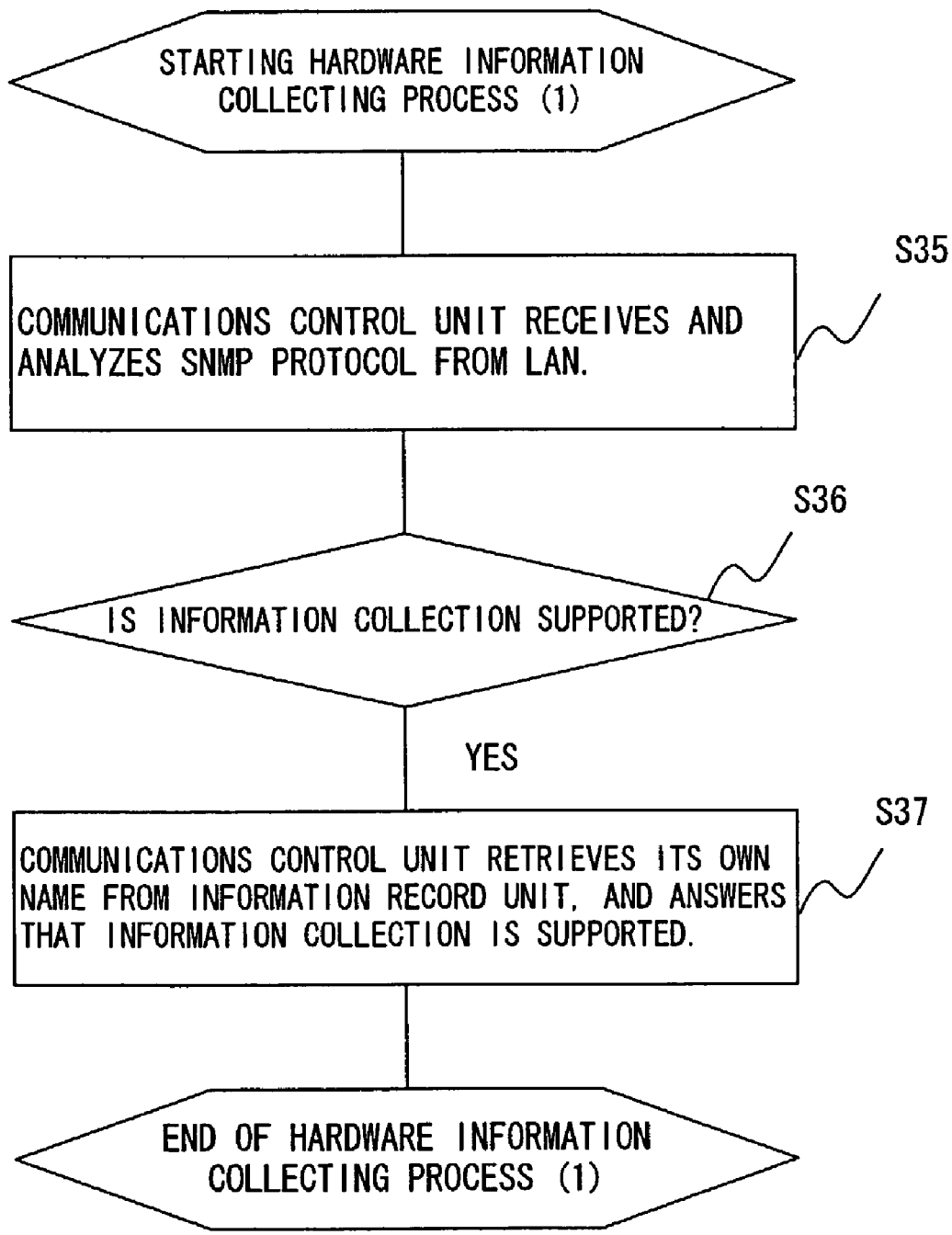
FIG. 17 is a flowchart of a hardware information collecting process (1)

FIG. 17 shows the process in step S14 shown in FIG. 12, that is, a detailed flowchart of the hardware information collecting process (1). When the process starts as shown in FIG. 17, the communications control unit 44 of the hardware receives and analyzes the communications data of the SNMP protocol transmitted from the management server 16 through the LAN. In step S36, it is determined whether or not the device supports the information collection. If yes, then the communications control unit 44 retrieves the name of the device to which it belongs from the information record unit 43, returns with the name an answer to the management server 16 that the information collection is supported in step S37, thereby terminating the process.

If the information collection is not supported, the hardware information collecting process (1) terminates without performing the process in step S37. In step S33 shown in FIG. 15, the communications control unit 34 of the management server 16 inquires whether or not there is the support with a time limit. If there is no answer within the time limit, it is automatically determined that the device does not support the information collection. In this case, for example, information is collected by manual input, and data is related to each other as shown in FIGS. 8 through 11.

Figure 18:
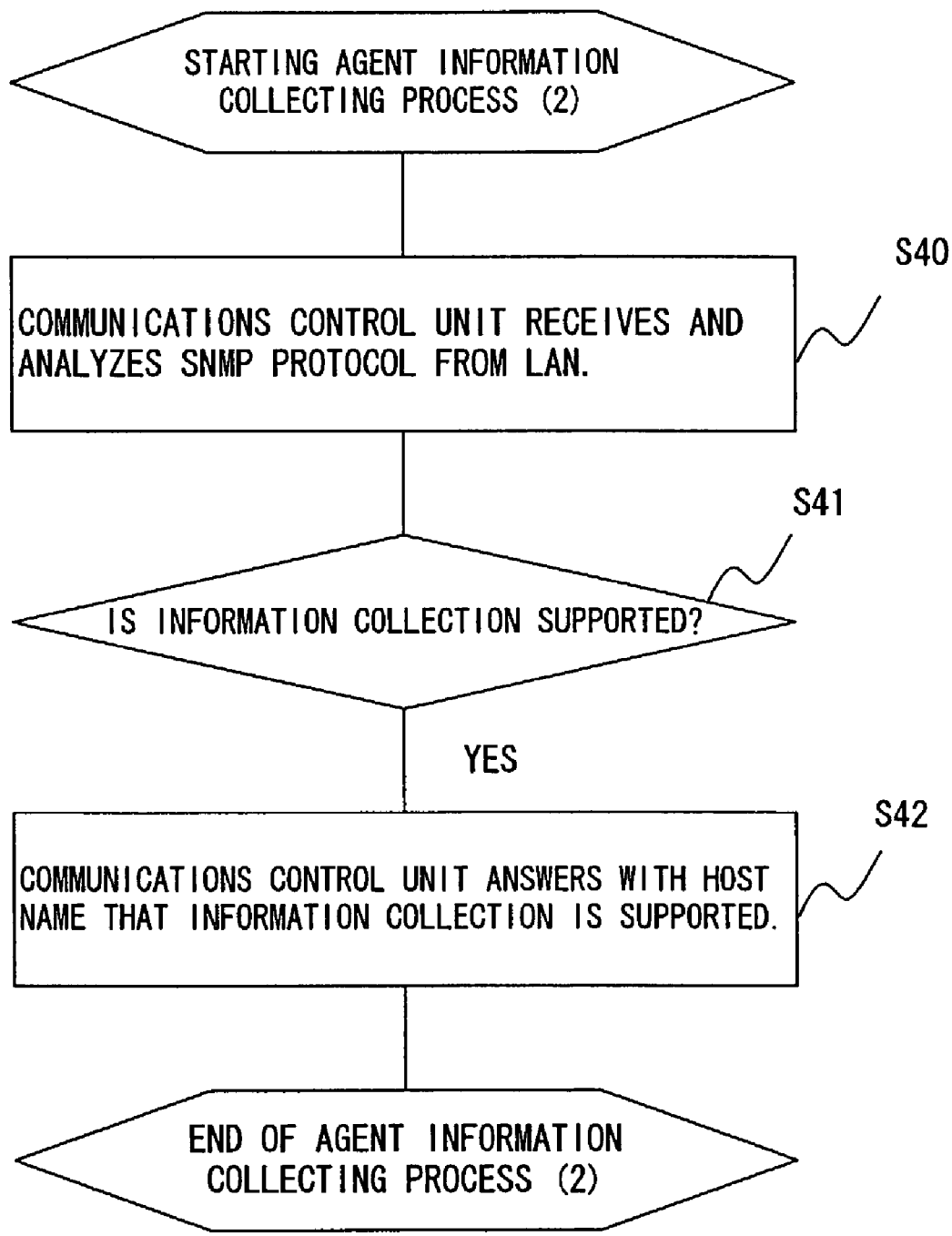
FIG. 18 is a flowchart of an agent information collecting process (2)

FIG. 18 shows the process in step S15 shown in FIG. 12, that is, a detailed flowchart of the agent information collecting process (2), In FIG. 18, first in step S40, the communications control unit 24 of the agent 21 receives and analyzes the communications data of the SNMP protocol transmitted from the management server 16 through the LAN, and it is determined in step S41 whether or not the host to which it belongs supports the information collection. If yes, then in step S42, the communications control unit 24 returns to the management server 16 the host name and the information that the information collection is supported, thereby terminating the process. If it is determined that the information collection is not supported in step S41, then no process is performed as shown in FIG. 17.

The processes in steps S45 through S47 shown in FIG. 15 are the detailed processes flow of the process in step S16 shown in FIG. 12. In step S45, the communications control unit 34 of the management server 16 notifies the information collection unit 31 of a list of the devices which have returned the answers within the time limit given in step S33 that the information collection is supported. In step S46, in response to the answer, the information collection unit 31 requests the communications control unit 34 to perform the detailed information collecting process on each of the listed devices.

The communications control unit 34 inquires of each device about detailed information using the SNMP with a time limit set in step S47.

Figure 19:
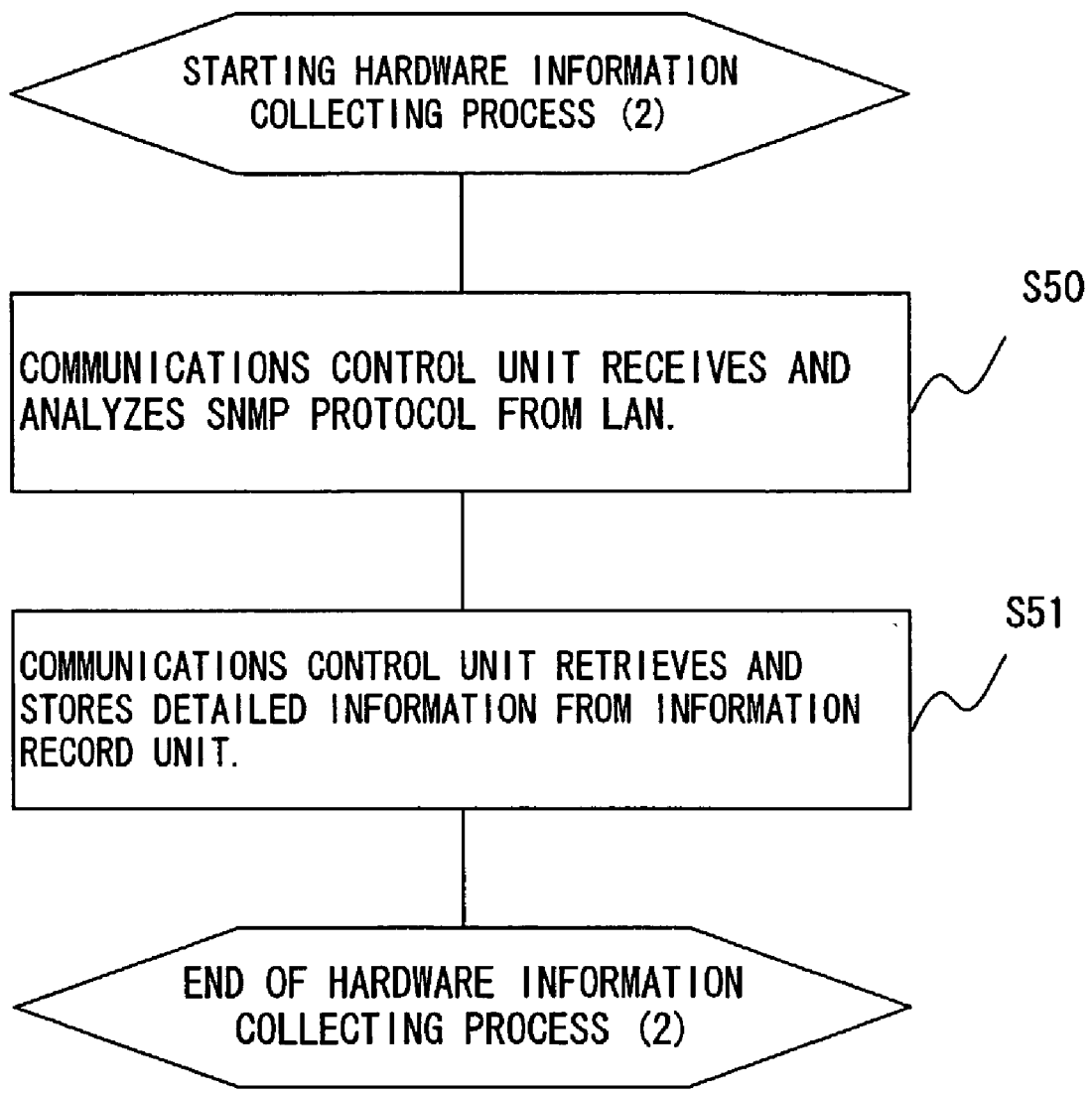
FIG. 19 is a flowchart of a hardware information collecting process (2)

FIG. 19 shows the process in step S17 shown in FIG. 12, that is, the detailed flowchart of the hardware information collecting process (2). In FIG. 19, first in step S50, the communications control unit 44 of the hardware receives and analyzes the communications data transmitted using the SNMP protocol through the LAN. In step S51, the communications control unit 44 retrieves detailed information from the information record unit 43, and the detailed information is transmitted to the management server 16, thereby terminating the process.

Figure 20:
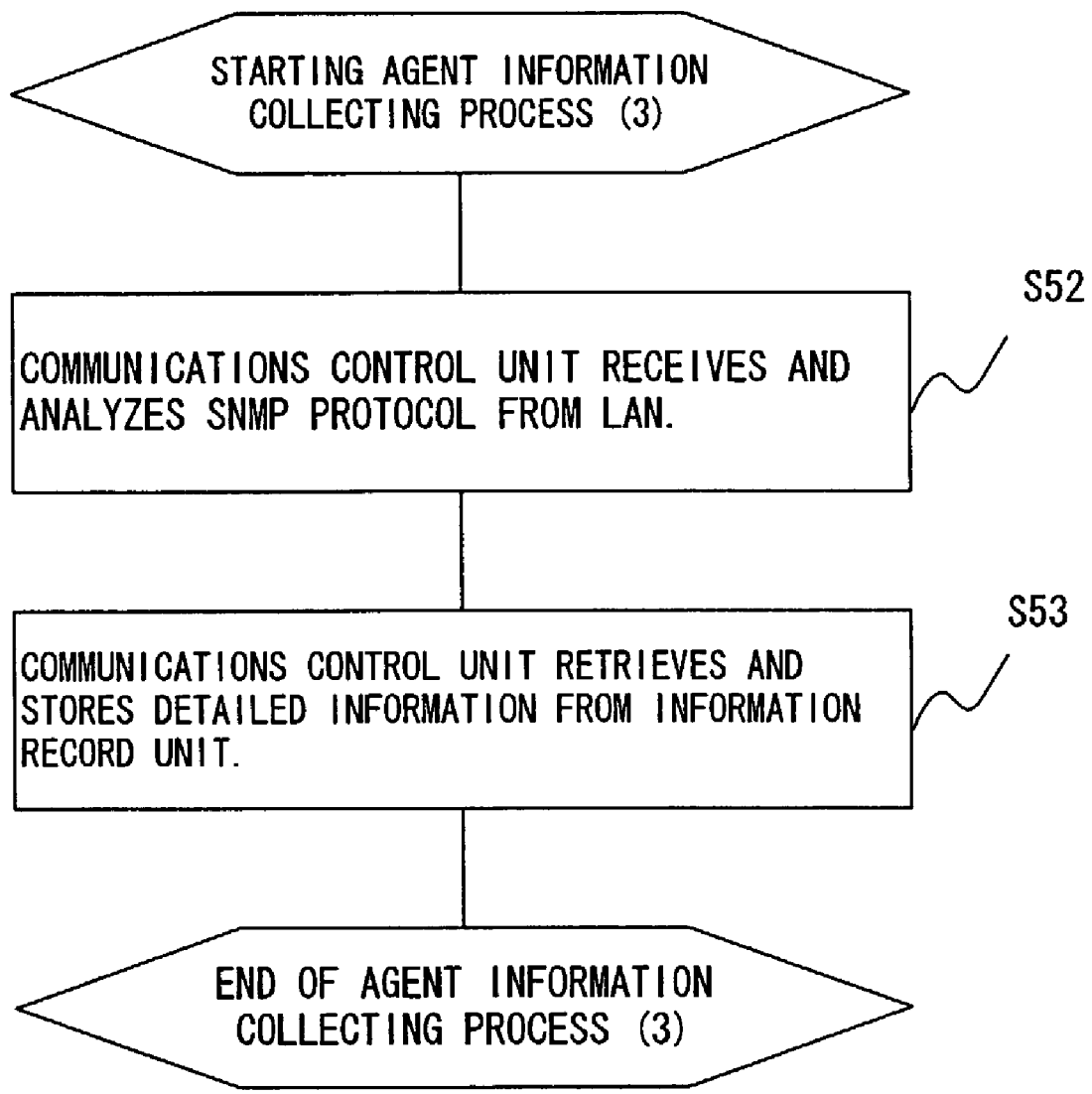
FIG. 20 is a flowchart of an agent information collecting process (3)

FIG. 20 shows the process in step S18 shown in FIG. 12, that is, the detailed flowchart of the hardware information collecting process (3). First in step S52, the communications control unit 24 of the agent 21 receives and analyzes the communications data using the SNMP through the LAN. In step S53, the communications control unit 24 retrieves all related information from the information record unit 23, and the related information is returned to the management server 16, thereby terminating the process.

Figure 16:
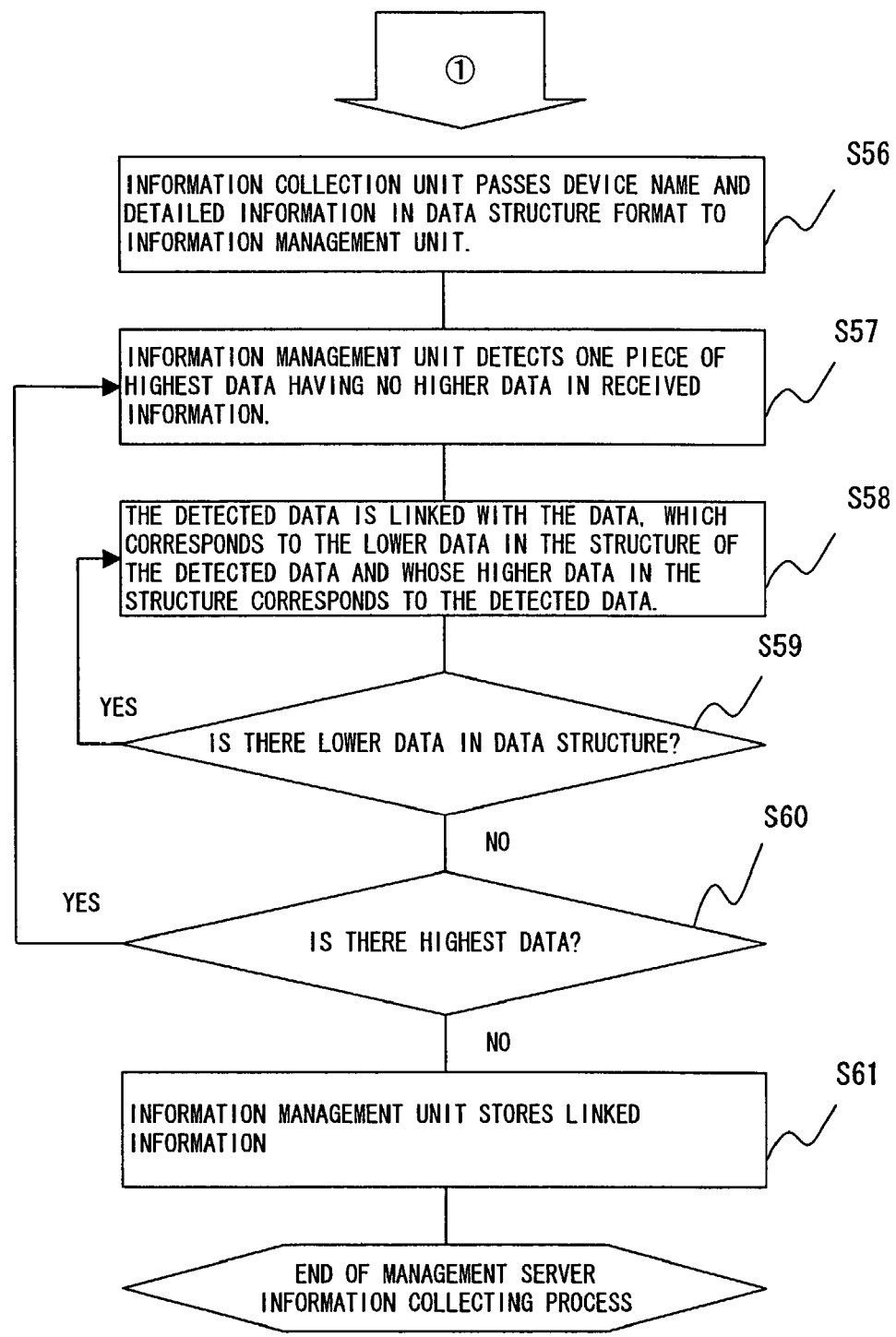
FIG. 16 is a flowchart (2), which continues from the flowchart (1) above, of a management server information collecting process.

Step S55 shown in FIG. 15 and steps S56 through S61 shown in FIG. 16 are the detailed flow of step S19 shown in FIG. 12. First is step S55, the information collection unit 31 is notified of the answer (detailed information) from each device within the time limit given in step S47. In step S56, the information collection unit 31 of the management server 16 transmits the device name and detailed information to the information management unit 32 in the format of data structure including the higher and lower devices as described above by referring to FIGS. 9 through 11. In step S57, the information management unit 32 detects the highest data having no higher data in the received information. In step S58, the detected data is linked with the data, which corresponds to the lower data in the structure of the detected data, and whose higher data in the structure corresponds to the detected data. In step S59, it is determined whether or not a lower data, that is, a lower device is described in the data structure of the linked lower data. If yes, then the processes in and after step S58 are repeated.

If there is no lower data in step S59, that is, no lower device is specified, then it is determined in step S60 whether or not there is another piece of highest data. If yes, the processes in and after step S57, that is, the processes in and after the process of the information management unit 32 selecting one piece of the highest data having no higher data are repeated. if it is determined in step S60 that there is not highest data any more, then the information management unit 32 stores the linked information in, for example, the information storage database 19, thereby terminating the process in step S61.

Figure 21:
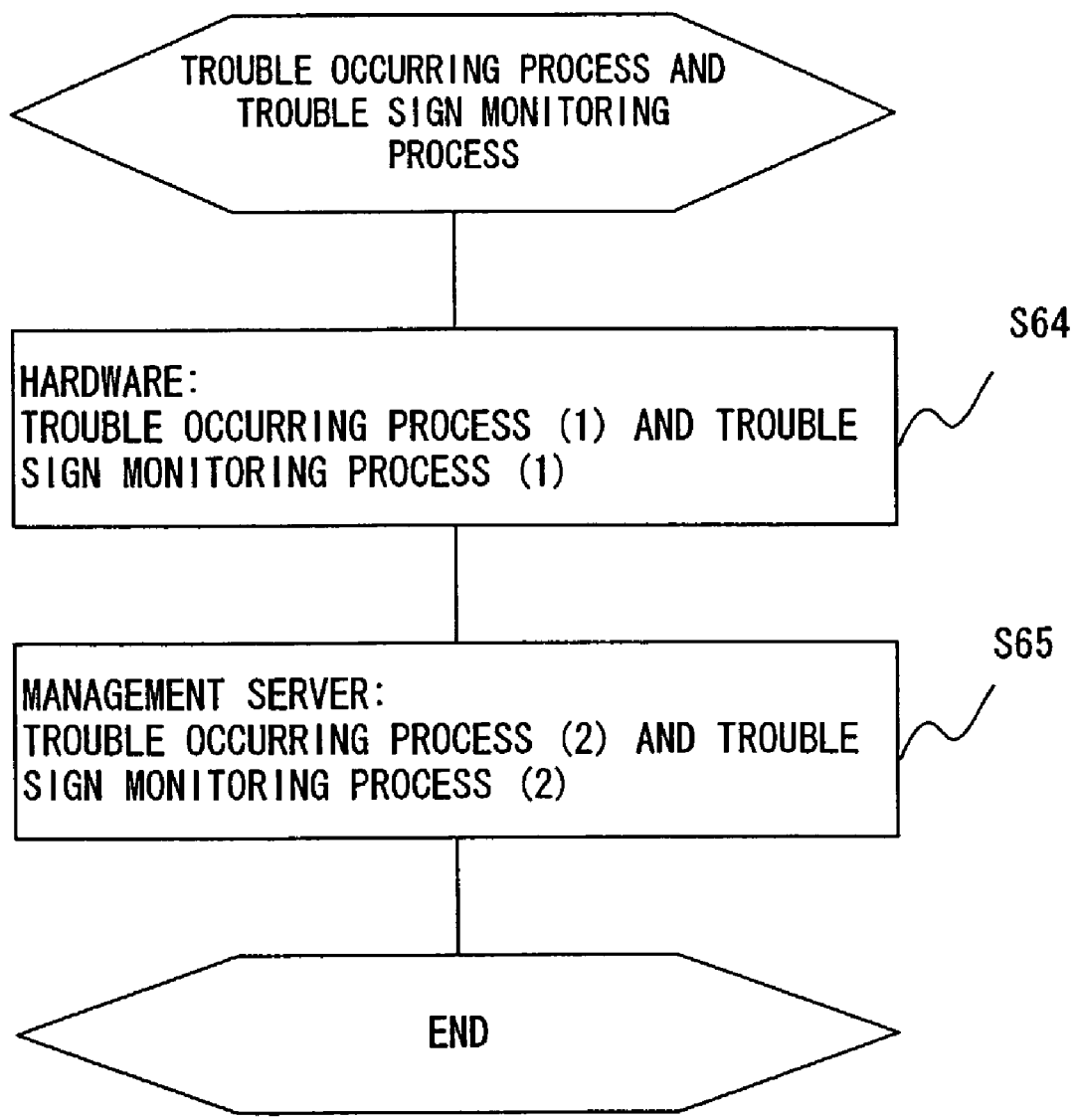
FIG. 21 is an entire flowchart of a trouble occurring process or a sign monitoring process.

FIG. 21 is an entire flowchart of the trouble occurring process or the trouble sign monitoring process. In step S64, the trouble occurring process (1) or the trouble sign monitoring process (1) is performed in the hardware. In step S65, the trouble occurring process (2) or the trouble sign monitoring process (2) is performed in the management server, thereby terminating the process. These processes are described in detail by referring to FIGS. 22 through 25.

Figure 22:
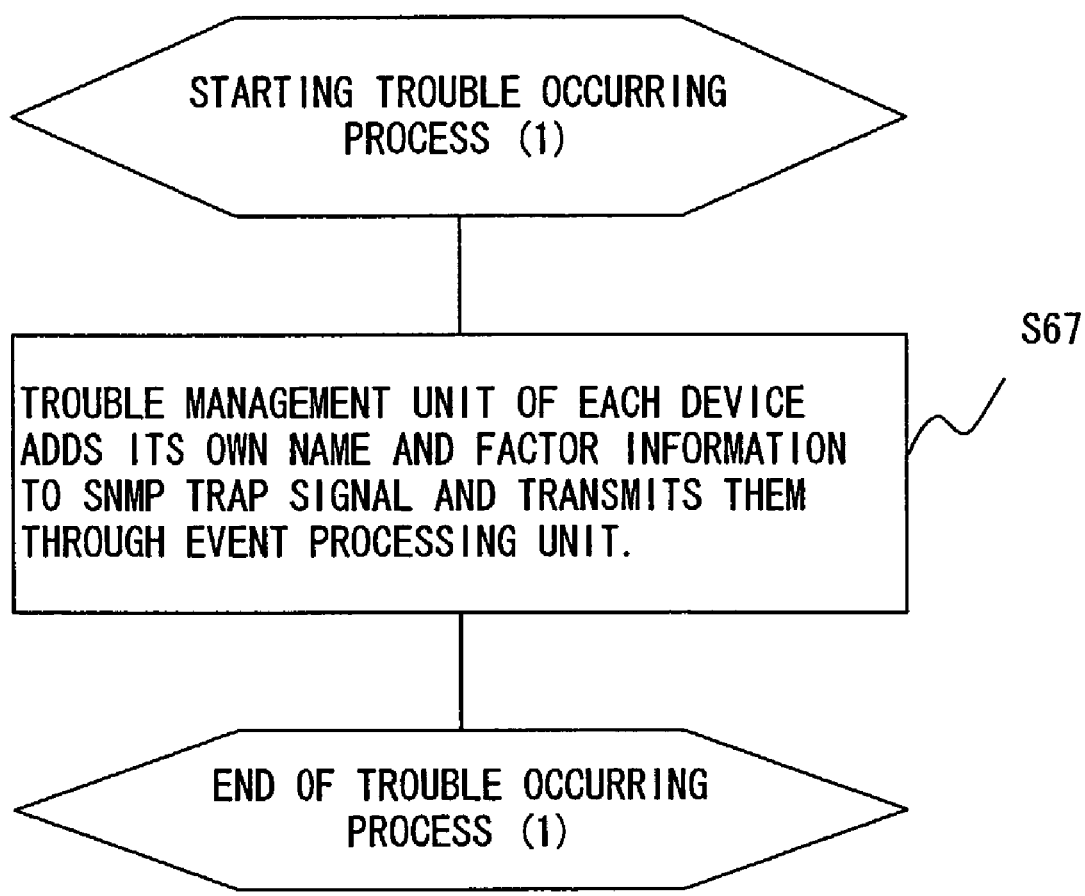
FIG. 22 is a flowchart of a trouble occurring process (1)

FIG. 22 is a flowchart of the trouble occurring process (1) in step S64 shown in FIG. 21. In FIG. 22, when a trouble occurs, the hardware or the agent in the host, that is, the trouble management unit of each device transmits the notification that the trouble has occurred with the name of the device and the information about the factor of the trouble added as a SNMP trap signal to the management server 16 through the event processing unit, thereby terminating the process. The SNMP trap signal is a non-periodical packet, and the packet stores the trouble generation factor information, etc.

Figure 23:
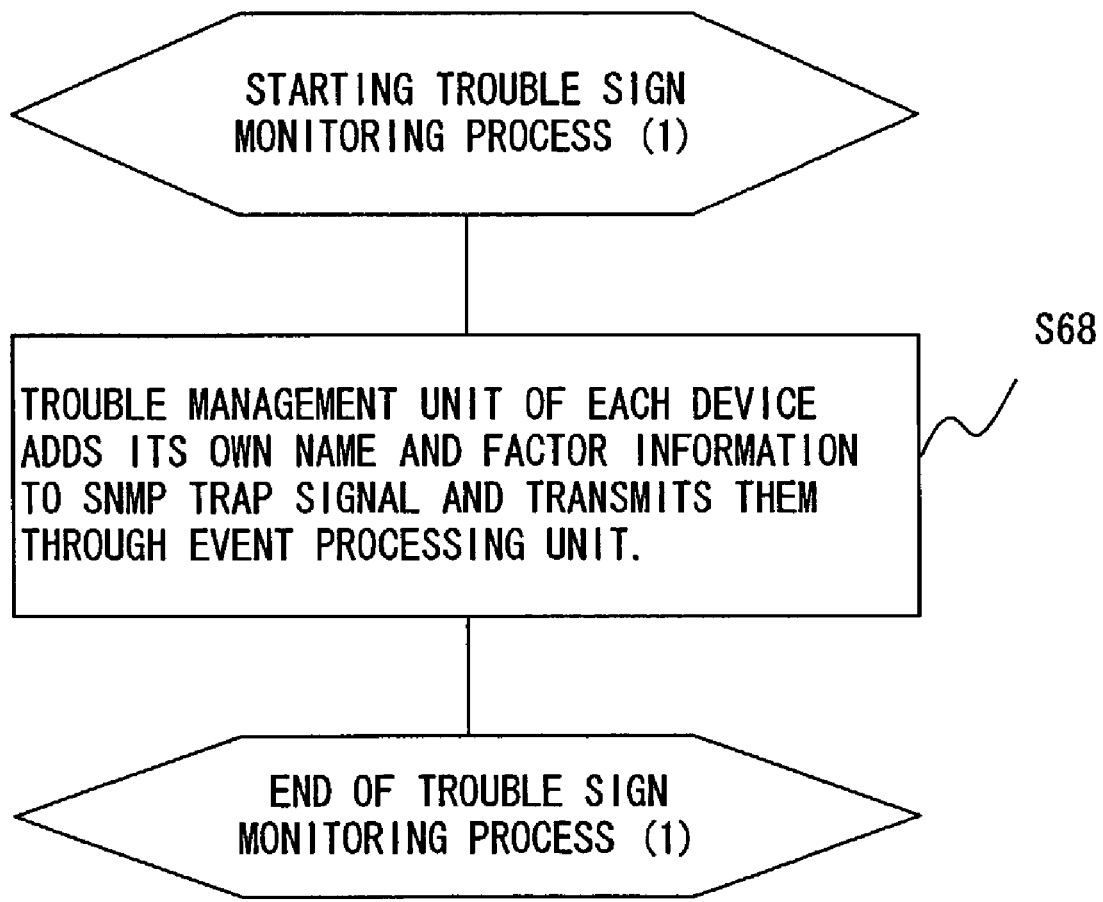
FIG. 23 is a flowchart of a trouble sign monitoring process (1)

FIG. 23 is a flowchart of the trouble sign monitoring process (1) in step S64 shown in FIG. 21. The trouble sign monitoring process refers to the process of monitoring a sign phenomenon implying a trouble if the phenomenon frequently occurs. If the sign phenomenon occurs, the trouble management unit of each device transmits a sign phenomenon notification as an SNMP trap signal to the management server 16 through the event processing unit with the name of the device and the sign phenomenon factor information added to the notification, thereby terminating the process.

Figure 24:
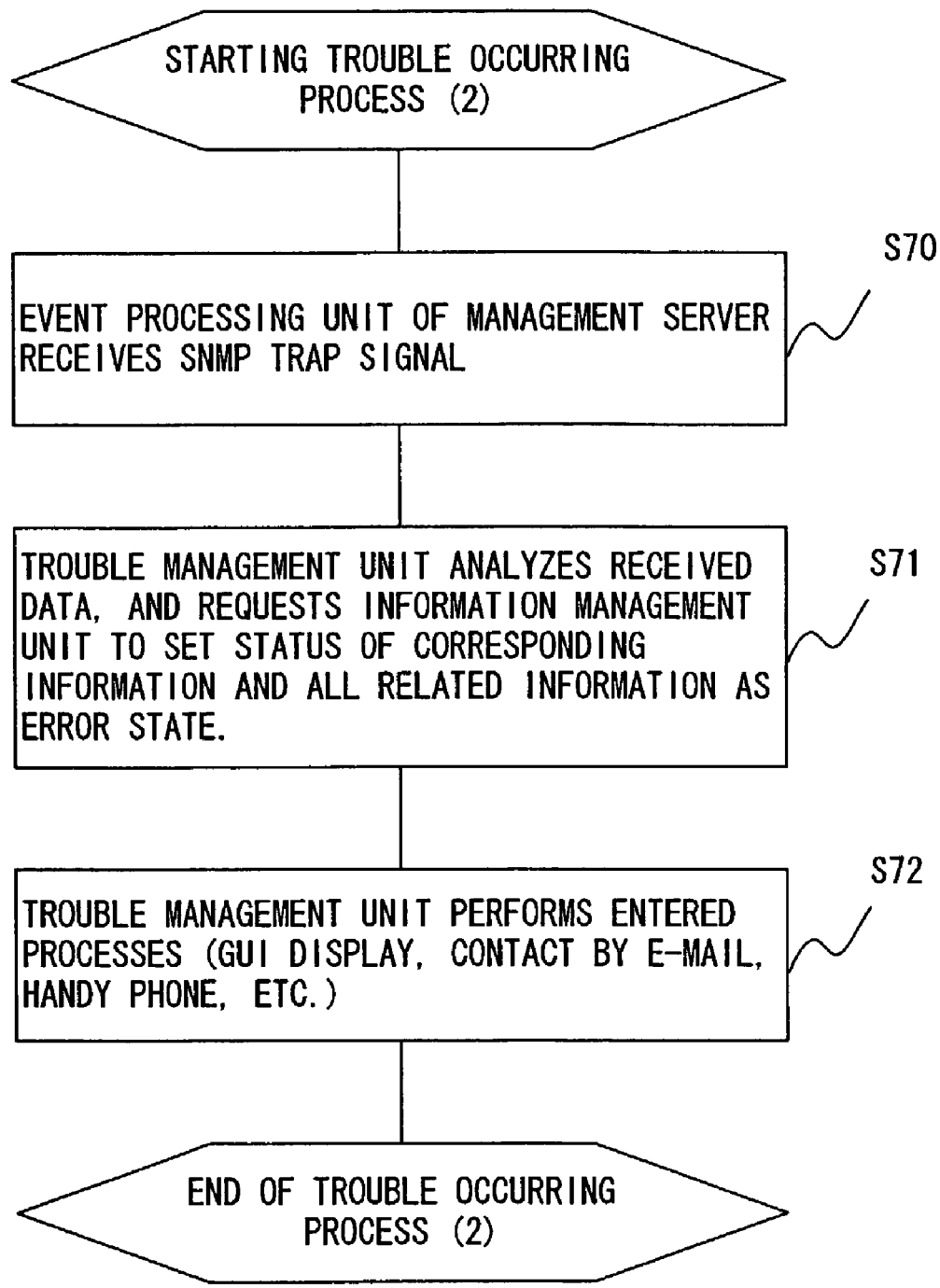
FIG. 24 is a flowchart of a trouble occurring process (2)

FIG. 24 is a detailed flowchart of the trouble occurring process (2) in the management server in step S65 shown in FIG. 21. First, in step S70, the event processing unit 35 of the management server 16 receives an SNMP trap signal transmitted through the LAN. In step S71, the trouble management unit 36 analyzes received data, and requests the information management unit 32 to set as an error state the status of the data of the device issuing a notification of the occurrence of trouble and all related higher or lower devices. In step S72, the trouble management unit 36 performs an entered process to be performed when trouble occurs, for example, displaying a graphic user interface (GUI), contacting a user by E-mail, a handy phone, etc., thereby terminating the process.

Figure 25:
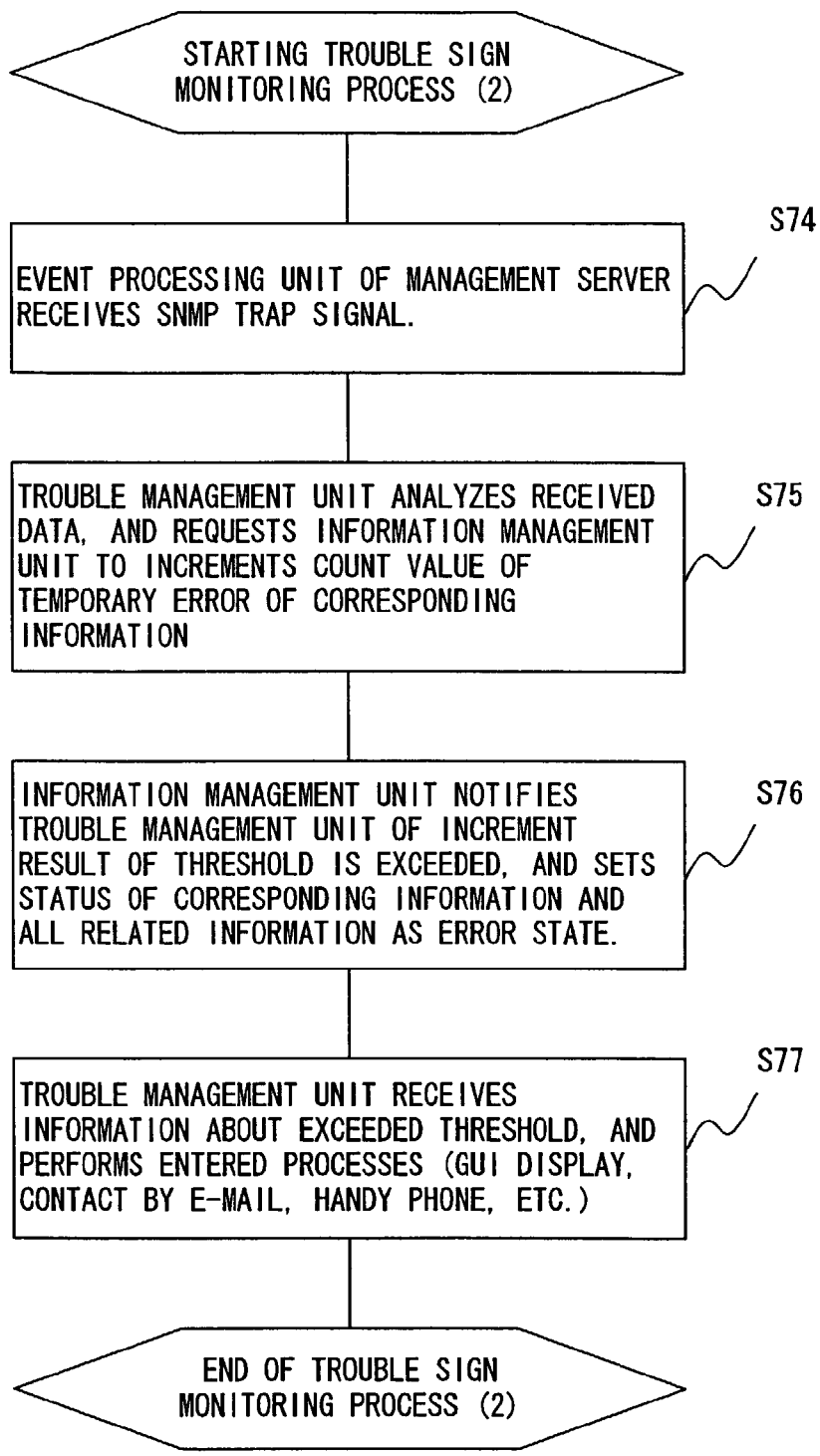
FIG. 25 is a flowchart of a trouble sign monitoring process (2)

FIG. 25 is a detailed flowchart of the trouble sign monitoring process (2) in the management server in step S65 shown in FIG. 21. First, in step S74, as in step S70 shown in FIG. 24, the event processing unit 35 receives an SNMP trap signal, the trouble management unit 36 analyzes received data in step S75, and requests the information management unit 32 to increment the value of the temporary error count corresponding to the device.

The information management unit 32 determines in step S76 whether or not the value of the temporary error count has exceeded a threshold. If yes, then the status of the data of a corresponding device and all related higher and lower devices is set as an error state, and a notification that the threshold has been exceeded is issued to the trouble management unit 36. In step S77, the trouble management unit 36 receives the notification, and the process entered to be performed when trouble occurs is performed, thereby terminating the process, as in step S72.

Figure 26:
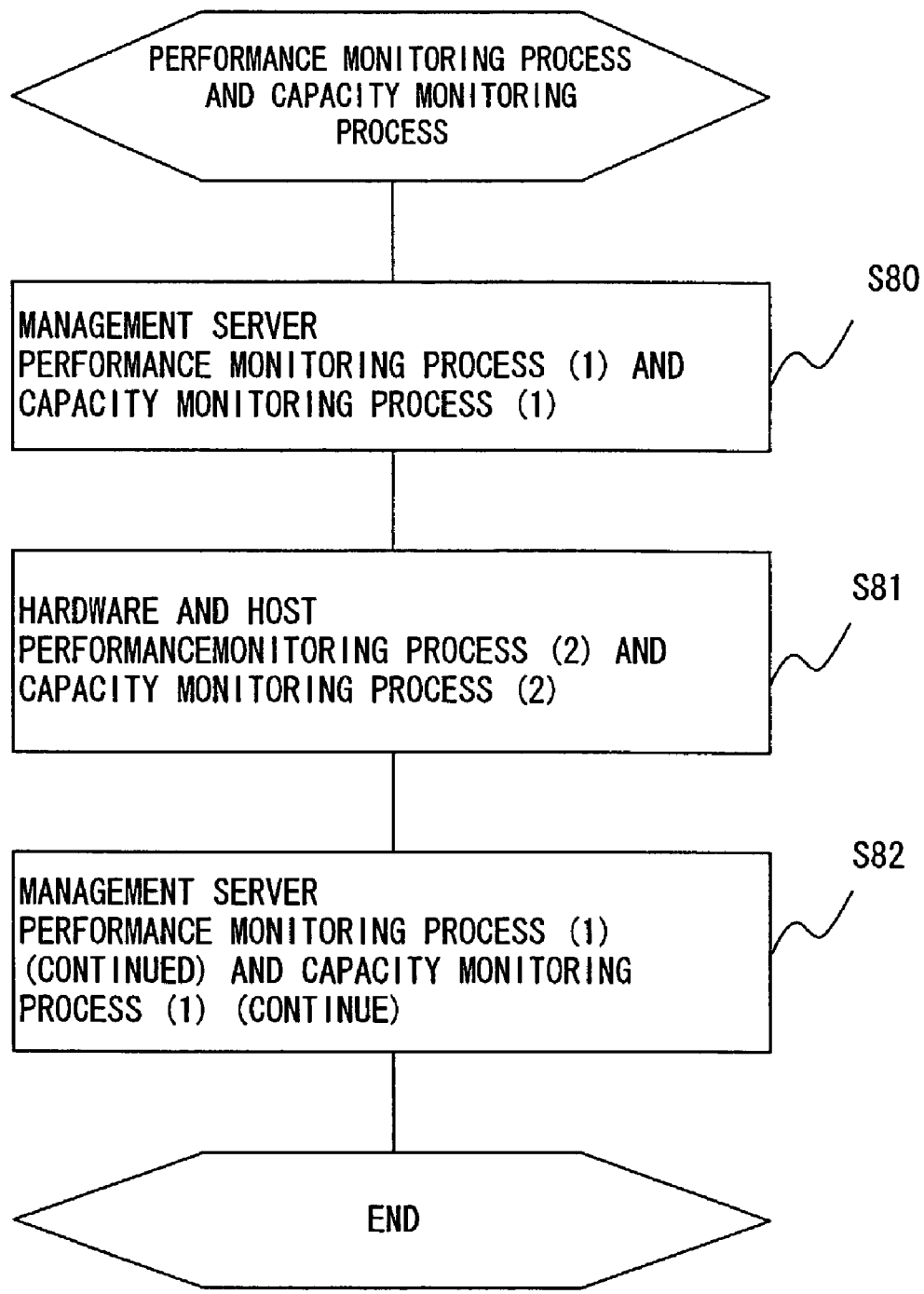
FIG. 26 is an entire flowchart of a performance monitoring process or a capacity monitoring process.

FIG. 26 is an entire flowchart of the performance monitoring process or the capacity monitoring process. In FIG. 26, the management server 16 performs the performance monitoring process (1) or the capacity monitoring process (1) in step S80. In step S81, in the hardware or the host, the performance monitoring process (2) or the capacity monitoring process is performed in the hardware or the host. In step S82, the performance monitoring process or the capacity monitoring process is continued in the management server 16, thereby terminating the process. The details of these processes are shown in FIGS. 27 through 30.

Figure 27:
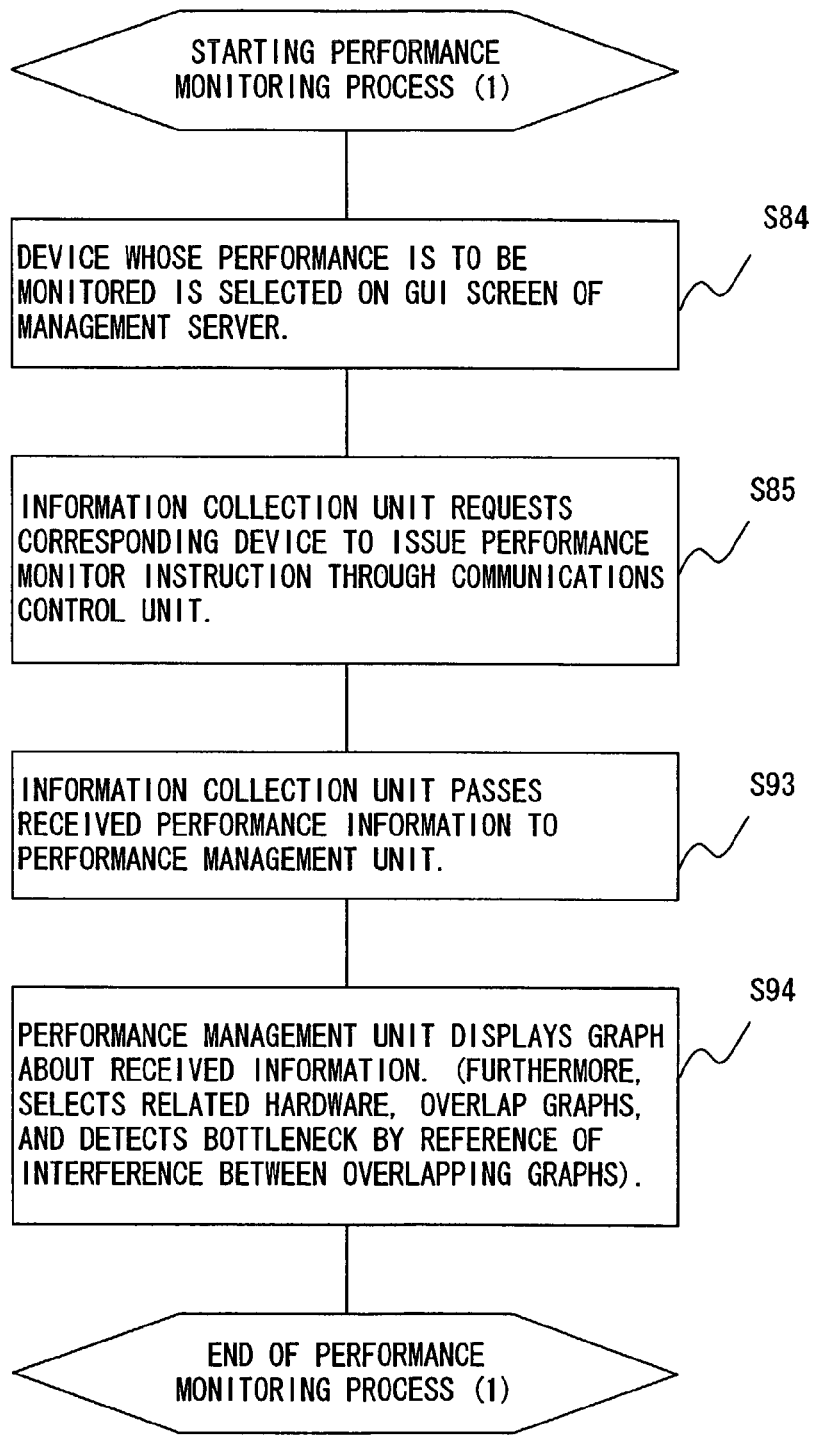
FIG. 27 is a flowchart of a performance monitoring process (1)

The processes in steps S84 and S85 shown in FIG. 27 are the detailed descriptions of the performance monitoring process (1) in step S80 shown in FIG. 26. First, in step S84, for example, a user selects a device to be monitored on the GUT screen of the management server 16. In step S85, the information collection unit 31 requests the communications control unit 34 to issue an instruction to monitor the device.

Figure 28:
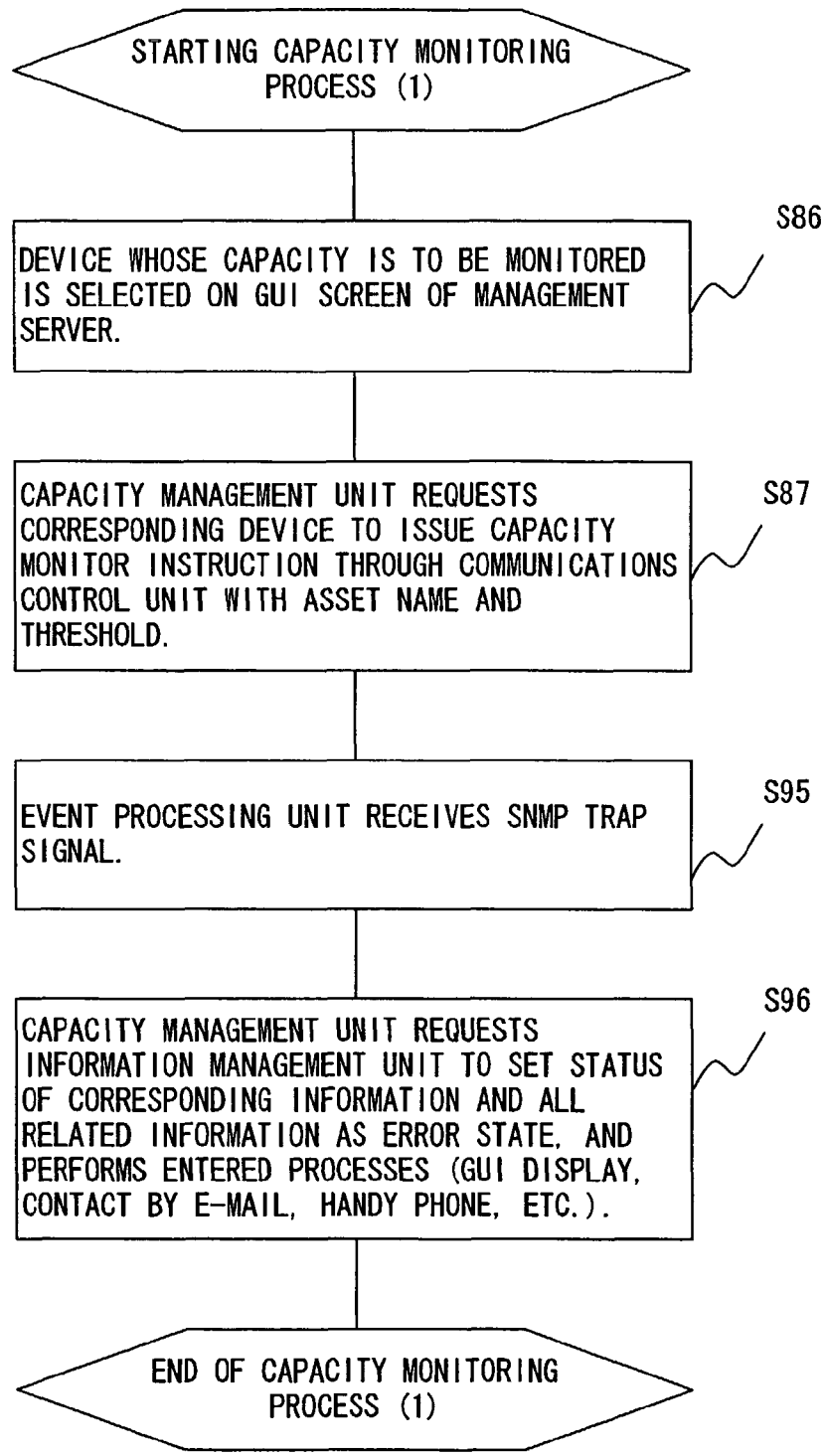
FIG. 28 is a flowchart of a capacity monitoring process (1)

The steps S86 and S87 shown in FIG. 28 are the details of the capacity monitoring process (1) in step S80 shown in FIG. 26. First, in step S86, as in step S84 shown in FIG. 27, a device, for example, a storage device, to be monitored by, for example, a user is selected to monitor about the capacity already used for storage of data. In step S87, the capacity management unit 38 requests the communications control unit 34 to issue an instruction to monitor the capacity of the selected device after specifying the asset name and the threshold of the capacity of the device, etc.

Figure 29:
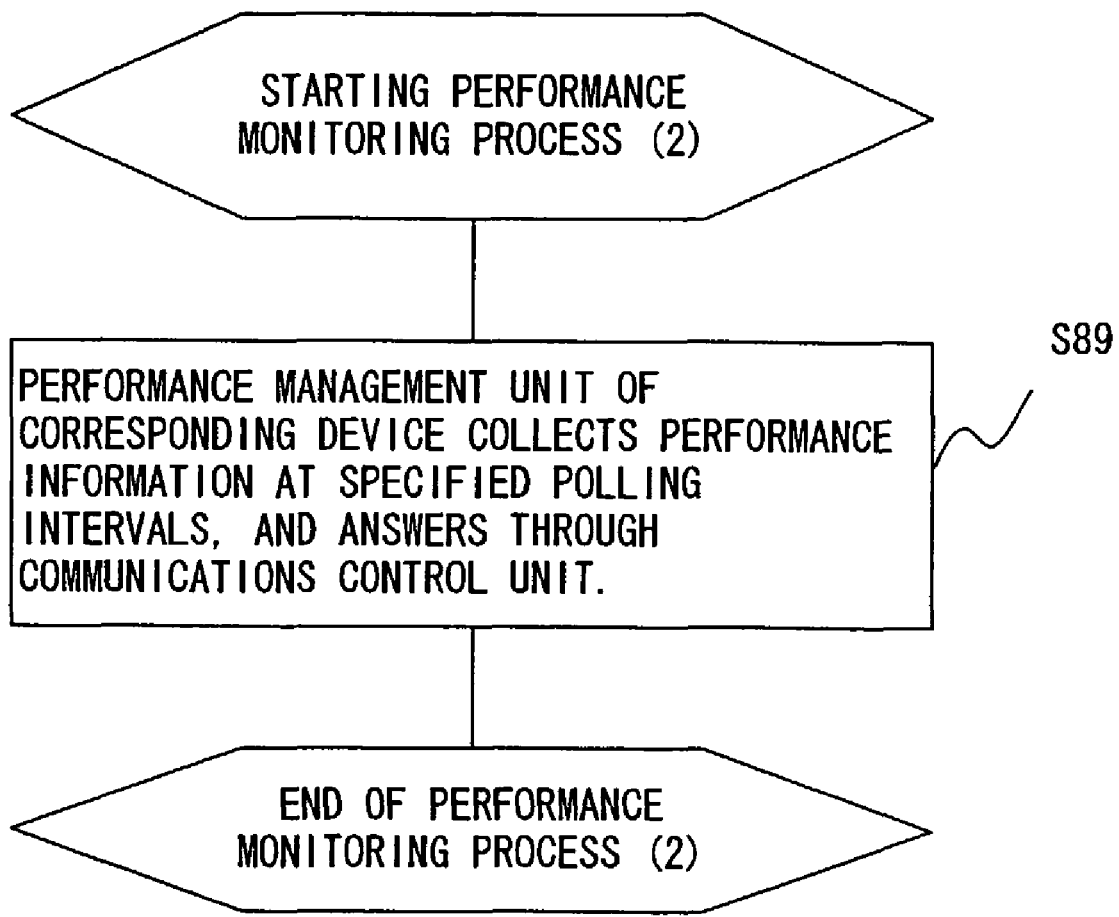
FIG. 29 is a flowchart of a performance monitoring process (2)

FIG. 29 shows the detailed performance monitoring process (2) in step S81 shown in FIG. 26. In step S89, the performance management unit 47 of the selected device whose performance is to be monitored collects the performance information at the polling intervals specified by, for example, a user, and a reply is transmitted to the management server 16 through the communications control unit 44.

FIG. 30 shows the details of the capacity monitoring process (2) in step S81. In step S90, the capacity management unit 48 of the device whose capacity is specified to be monitored collects the capacity information at the specified polling intervals to monitor whether or not the threshold specified by the management server 16 has been exceeded. If the threshold has been exceeded, the capacity management unit 48 transmits to the management server 16 through the event processing unit 45 an SNMP signal including the name of the device and factor information about the fact that the threshold has been exceeded.

Steps S93 and S94 shown in FIG. 27 are continued from the performance monitoring process (1) in step S82 shown in FIG. 26. In step S93, the information collection unit 31 passes to the performance management unit 37 the performance information received from the selected device whose performance is to be monitored. In step S94, the performance management unit 37 displays a graph of the received performance information. Additionally, the data of the higher and lower devices to the selected device whose performance is to be monitored is selected, and a bottleneck can be detected by overlapping the graphs indicating the states of the data. The bottleneck detecting process is further described later.

Steps S95 and S96 shown in FIG. 28 are continued from the capacity monitoring process (1) in step S82 shown in FIG. 26. In step S95, the event processing unit 35 receives an SNMP trap signal. In step S96, the capacity management unit 38 requests the information management unit 32 to set as the error state the status of the data of the device whose capacity has exceeded a threshold and all devices related to the higher and lower devices to the device, and the process entered to be performed when the threshold is exceeded, for example, displaying the graphic user interface (GUI), contacting a user through E-mail and a handy phone, etc., thereby terminating the process.

Figure 31:
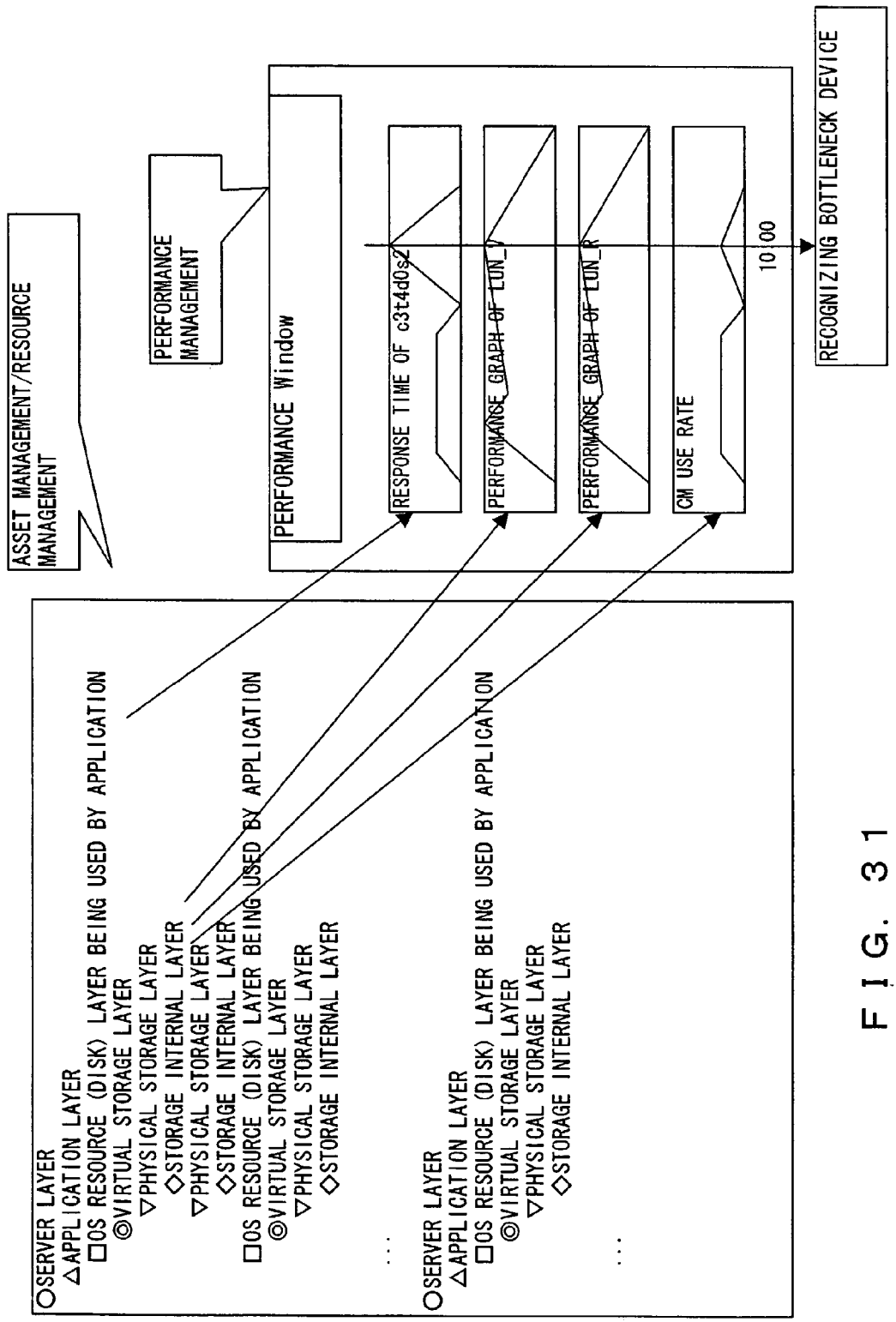
FIG. 31 shows a bottleneck detecting method by a performance management unit of a management server.

FIG. 31 shows the method of detecting a bottleneck, etc. by the performance management unit 37 of the management server 16 explained in step S94 shown in FIG. 27. In the management server 16 shown in FIG. 4, the performance management unit 37 manages the performance, the information management unit 32, etc. manages assets and resources. Furthermore, although not shown in FIG. 4, in combination with the function of transferring data to other assets, a navigation service for transfer of data to other assets can be provided when a bottleneck occurs.

In FIG. 31, for example, a performance window is opened on the display screen of the management server 16, and various graphs relating to the performance of the hardware device are combined and displayed. In this example, the graph of the response time of a low device (c3t4d0s2), that is, the time taken by an agent in the host to return a reply in response to a request from the server, the performance graph of a logical unit (LUN-V) corresponding to a virtual storage layer, the performance graph of a logical unit (LUN-R) corresponding to a physical storage layer, and the graph of a use rate of the RAID controller (CM) are displayed. By comparing these graphs, a bottleneck device is recognized.

The above mentioned navigation service is further described below. For example, when the throughput of an application in a host is reduced, the performance management unit 37 analyzes the OS resources being used by the application, and the deterioration of a specific device is automatically detected. Then, the performance management unit 37 analyzes the inside of the storage of the device. For example, a bottleneck of the configuration of a RAID is determined, a warning is displayed, and the scope (other hosts, applications, etc.) of the influence of the bottleneck is displayed as blinking.

In the navigation service, the display of the assumed performance after the tuning such as a transfer of data to other assets, the display of the entire configuration, an influenced portion by a change in configuration, etc. are shown. After the user selects the assets of the destination of data, a replica of the corresponding assets can be generated using a data transfer tool, thereby continuing the operation of the application.

As described above, according to the present embodiment, as for the assets in a host computer, that is, a file and an application using the file, asset information is transmitted to the management server using a unique data configuration by the agent of each host through the LAN corresponding to a non-periodical polling from the management server when the asset information is required by the management server.

The path of a fiber channel and the assets of a disk array, that is, a channel adapter, a device adapter, etc. are centralized by the management server through the LAN using the data structure of unique asset information corresponding to the non-periodic polling from the management server. In each data structure, the related information adjacent as higher and lower data is stored, and the information from the application information in the host computer to the device information about a disk array is related.

When a trouble occurs in the path between the host and the storage, or when a specific device in a disk array becomes faulty, non-periodical error information is transmitted to the management server, and the management server retrieves already centralized information using a unique data structure, and the system of notifying of the occurrence of trouble can be prepared for an application in the possible scope of the trouble.

When the deterioration in throughput is detected in the online process, etc. on the host side, the resources being used by the application are retrieved, and the performance of the resources is compared to detect a bottleneck. In addition, by setting a threshold of a capacity, or by accumulating temporary counts, an application can be stopped due to over-capacity, or a trouble sign of a device can be monitored.

As described above, the computer system for centrally managing the asset information of the present invention is described above in detail, but the most important management server according to the present embodiment, etc. can be configured as a common computer system. FIG. 32 is a block diagram of the configuration of the computer system, that is, a hardware environment.

In FIG. 32, the computer system is configured by a central processing unit (CPU) 80, read-only-memory (ROM) 81, random access memory (RAM) 82, a communications interface 83, a storage device 84, an input/output device 85, a reading device 86 of a portable storage medium, and a bus 87 connecting these components.

A storage device 84 can be various storage devices such as a hard disk, a magnetic disk, etc. The storage device 84 or the ROM 81 stores programs shown in the flowcharts in FIGS. 6 and 12 through 30. These programs are executed by the central processing unit (CPU) 80, thereby realizing central management of data by the management server and a notification of data from the host computer, the hardware device, etc.

These programs can also be stored in, for example, the storage device 84 from an information provider 88 through a network 89 and the communications interface 83, or can be stored in a marketed and distributed portable storage medium 90, and can be set in the reading device 86 and executed by the CPU 80. The portable storage medium 90 can be various types of storage media such as CD-ROM, a flexible disk, an optical disk, a magneto-optical disk, etc. By the reading device 86 reading the program stored in such a storage medium, assets data can be centrally managed according to the embodiments of the present invention.

According to the present invention as described above, first, the assets used by which application can be easily informed of by centrally managing data with the assets of the entire system associated with each other, and second, it can be easily informed of a trouble of which asset affects which application.

Third, an application can be protected against a stop due to an insufficient capacity by setting a threshold for the capacity of each asset such as a file, etc. used for each application. Additionally, by monitoring a temporary error of a device, that is, by monitoring a sign of trouble, the trouble can be predicted before a fatal problem actually appears, thereby preventing the stop of an application.

What is claimed is:

1. A computer system for central management of assets information, comprising:
   one or more host computers;
   one or more hardware devices;
   a management server; and
   a database for storing information used by the management server, and
   wherein each of said one or more hardware devices provided to said one or more host computers at least including one of a host bus adapter, a disk array and a switch, each of said one or more hardware devices comprises an input/output processing unit, an information record unit, a communications control unit, an event processing unit, a trouble management unit, a performance management unit, and a capacity management;
   each of said one or more host computers comprises an agent unit notifying the management server of information about assets in a device to which a corresponding host computer belongs in response to a request from the management server based on a data structure included in said agent unit in which higher and lower assets are associated and a host bus adapter, the host bus adapter is coupled with the disk array through the switch where the host bus adapter and the switch operate as a path between a host computer and the disk array;
   the agent unit comprises an information collection unit, an information record unit, a communications control unit, an event processing unit, a trouble management unit, a performance management unit, and a capacity management unit;
   the management server comprises an information collection unit, an information management unit managing information received from across each agent unit in association with said information about assets from said assets information notification unit in accordance with the data structure, an input/output processing unit, a communications control unit, an event processing unit, a trouble management unit, a performance management unit, and a capacity management unit;
   said data structure has an area storing data indicating higher and lower assets of current assets in the system,
   said agent unit generates information in which the data structure is in common among each host computer and each hardware device, and in response to a request from the management server, associates the higher and the lower assets and notifies of information having common data structure, and
   an application name on a host computer as a file name which is used in an application is associated with lower assets with a file name,
   said agent unit collects an application name and an access file, a database management system related to a database, a raw device as a lower device in a host computer, and an access file, a file system, and a raw device related to an operating system, and
   said agent unit collects information by issuing a command corresponding to each operating system when different operating systems are used among host computers, the obtained information is converted into a unique information format as a same information format for central management by the management server, and the converted information is transmitted to the management server.

2. The computer system according to claim 1, wherein:
   each of said agent unit of each host computer and said hardware device comprises a trouble management unit notifying said management server of data relating to trouble when the trouble occurs in a device to which each belongs; and
   upon receipt of the data relating to the trouble, said information management unit of said management server sets status of information about assets related to the trouble and information about assets relating to the assets as an error state among information associated corresponding to the data structure.

3. The computer system according to claim 1, wherein:
   each of said agent unit of each host computer and said hardware device comprises a trouble management unit notifying said management server of data indicating a sign of trouble each time the trouble can occur in a device to which each belongs; and
   each time said information management unit of said management server receives the data indicating the sign of the trouble, said information management unit increments a counter value corresponding to a device which has transmitted the data, and sets information about the assets of the device about which the data indicating the sign of the trouble is notified of, and information about assets relating to the assets as an error state among information associated corresponding to the data structure when the count value exceeds a threshold.

4. The computer system according to claim 1, wherein:
   each of said agent unit of each host computer and said hardware device comprises a performance management unit managing performance of a device to which each belongs, and said management server comprises a performance management unit managing performance of an entire system;
   said performance management unit of each hardware device and each host computer collects performance information about a device to which each belongs in response to a request to said management server, and transmits the information to said management server; and
   said performance management unit manages the performance of the entire system by associating information about assets of a device which has transmitted the performance information with information about other assets related by said information management unit.

5. The computer system according to claim 1, wherein:
   each of said agent unit of each host computer and said hardware device comprises a capacity management unit managing a capacity of an asset of a device to which each belongs;
   said capacity management unit of each host computer and each hardware device monitors whether or not the capacity of the asset of the device to which each belongs has exceeded a threshold in response to a request from the management server, and notifies said management server of the exceeded threshold when the threshold is exceeded; and
   said information management unit sets as an error state a status of information about assets whose threshold has been exceeded and information about assets related to the assets among information associated corresponding to the data structure.

6. The computer system according to claim 1, wherein:
   the application name on a host as the file name, which is used in said application or the assets of a database, is associated with a file system and a hardware device as lower assets with a file name; and data of a host bus adapter and a storage access path as assets lower than the hardware device is associated with another hardware device, and a further lower channel adapter, a device controller, a device adapter, a storage device are associated with the storage access path.

7. A computer-readable storage medium, used by a management server for central managing of assets information, storing a program for directing a computer to perform operations, comprising:

storing information used by the management server;

receiving information about assets of each device transmitted from each host computer and associating said information about assets of each device with information of each one or more hardware devices in the system based on a data structure in which higher and lower assets are associated;

associating the received information corresponding to the data structure; and wherein said data structure has an area storing data indicating higher and lower assets of current assets in the system, information in which the data structure is in common among each host computer and each hardware device is generated, and in response to a request, the higher and the lower assets are associated and information having common data structure is provided, an application name on a computer host as a file name which is used in an application is associated with lower assets with a file name, each host computer including a host bus adapter coupled with a disk array through a switch where the host bus adapter and the switch operate as a path between the host and the disk array, and each of said one or more hardware devices provided to said one or more host computers, and said one or more hardware devices comprising the host bus adapter, the disk array, the switch and an assets information notifying unit, wherein each of one or more hardware devices provided to one or more host computers at least including one of a host bus adapter, a disk array and a switch, each of said one or more hardware devices comprises an input/output processing unit, an information record unit, a communications control unit, an event processing unit, a trouble management unit, a performance management unit, and a capacity management;

an agent unit collects an application name and an access file, a database management system related to a database, a raw device as a lower device in a host computer, and an access file, a file system, and a raw device related to an operating system, and said agent unit collects information by issuing a command corresponding to each operating system when different operating systems are used among host computers, the obtained information is converted into a unique information format as a same information format for central management by the management server, and the converted information is transmitted to the management server.

8. A host computer configuring a computer system having a management server for managing assets in a system, comprising:

one or more hardware devices;

a database for storing information used by the management server;

a connection unit for connection to the computer system;

an agent unit notifying the management server of information about the assets of a device to which said unit belongs in response to a request from the management server, said information about the assets and information of said unit being associated based on a data structure included in said agent unit in which higher and lower assets are associated; and wherein each of said one or more hardware devices provided to one or more host computers at least including one of a host bus adapter, a disk array and a switch, each of said one or more hardware devices comprises an input/output processing unit, an information record unit, a communications control unit, an event processing unit, a trouble management unit, a performance management unit, and a capacity management;

wherein said data structure has an area storing data indicating higher and lower assets of current assets in the system, said agent unit generates information in which the data structure is in common among each hardware device, and in response to a request from the management server, associates the higher and the lower assets and notifies of information having common data structure, the agent unit comprises an information collection unit, an information record unit, a communications control unit, an event processing unit, a trouble management unit, a performance management unit, and a capacity management unit;

an application name on a host computer as a file name which is used in an application is associated with lower assets with a file name, each host computer including a host bus adapter coupled with a disk array through a switch where the host bus adapter and the switch operate as a path between the host and the disk array, and each said hardware device provided to said each host computer, and each said hardware device comprising the host bus adapter, the disk array the switch and an assets information notifying unit, said agent unit collects an application name and an access file, a database management system related to a database, a raw device as a lower device in a host computer, and an access file, a file system, and a raw device related to an operating system, and said agent unit collects information by issuing a command corresponding to each operating system when different operating systems are used among host computers, the obtained information is converted into a unique information format as a same information format for central management by the management server, and the converted information is transmitted to the management server.

9. A management server for managing assets in a computer system configured by one or more host computers and one or more hardware devices, comprising:

one or more host computers;

one or more hardware devices; and a database for storing information used by the management server;

a connection unit for connection to the computer system;

an information management unit managing information transmitted from each of said one or more host computers and each of said one or more hardware devices in association with each other based on a data structure included in an agent in which higher and lower assets are associated; and wherein each of said one or more hardware devices provided to said one or more host computers at least including one of a host bus adapter, a disk array and a switch, each of said one or more hardware devices comprises an input/output processing unit, an information record unit, a communications control unit, an event processing unit, a trouble management unit, a performance management unit, and a capacity management;

wherein said data structure has an area storing data indicating higher and lower assets of current assets in the system, said agent unit generates information in which the data structure is in common among each host computer and each hardware device, and in response to a request from the management server, associates the higher and the lower assets and notifies of information having common data structure, an application name on a host computer as a file name which is used in an application is associated with lower assets with a file name, each host computer including a host bus adapter coupled with a disk array through a switch where the host bus adapter and the switch operate as a path between the host and the disk array, and each of said one or more hardware devices provided to said one or more host computers, and said one or more hardware devices comprising the host bus adapter, the disk array, the switch and an assets notification information, said agent unit collects an application name and an access file, a database management system related to a database, a raw device as a lower device in a host computer, and an access file, a file system, and a raw device related to an operating system, and said agent unit collects information by issuing a command corresponding to each operating system when different operating systems are used among host computers, the obtained information is converted into a unique information format as a same information format for central management by the management server, and the converted information is transmitted to the management server.

10. A computer system for central management of assets information, comprising:
one or more host computers;
one or more hardware devices;
a management server; and
a database for storing information used by the management server, and
wherein each of said one or more hardware devices provided to said one or more host computers at least including one of a host bus adapter, a disk array and a switch, each of said one or more hardware devices comprises an input/output processing unit, an information record unit, a communications control unit, an event processing unit, a trouble management unit, a performance management unit, and a capacity management;

each of said one or more host computers comprises an agent for notifying the management server of information about assets in a device to which a corresponding host computer belongs in response to a request from the management server based on a data structure included in said agent in which higher and lower assets are associated and a host bus adapter, the host bus adapter is coupled with the disk array through the switch where the host bus adapter and the switch operate as a path between a host computer and the disk array;

the agent unit comprises an information collection unit, an information record unit, a communications control unit, an event processing unit, a trouble management unit, a performance management unit, and a capacity management unit;

the management server comprises an information collection unit, an information management means for managing the information received from across each agent in association with said information from said assets information notification means in accordance with the data structure, an input/output processing unit, a communications control unit, an event processing unit, a trouble management unit, a performance management unit, and a capacity management unit;

wherein said data structure has an area storing data indicating higher and lower assets of current assets in the system, said agent generates information in which the data structure is in common among each host computer and each hardware device, and in response to a request from the management server, associates the higher and the lower assets and notifies of information having common data structure, and an application name on a host computer as a file name which is used in an application is associated with lower assets with a file name, said agent unit collects an application name and an access file, a database management system related to a database, a raw device as a lower device in a host computer, and an access file, a file system, and a raw device related to an operating system, and said agent unit collects information by issuing a command corresponding to each operating system when different operating systems are used among host computers, the obtained information is converted into a unique information format as a same information format for central management by the management server, and the converted information is transmitted to the management server.

* * * * *

UNITED STATES PATENT AND TRADEMARK OFFICE
CERTIFICATE OF CORRECTION

| | | |
|---|---|---|
| PATENT NO. | : 7,870,045 B2 | Page 1 of 1 |
| APPLICATION NO. | : 10/200736 | |
| DATED | : January 11, 2011 | |
| INVENTOR(S) | : Keiji Yagishita | |

It is certified that error appears in the above-identified patent and that said Letters Patent is hereby corrected as shown below:

Title Page Column 1 (Assignee), Line 1 delete "Kasasaki" and insert -- Kawasaki --, therefor.

Signed and Sealed this
Nineteenth Day of April, 2011

David J. Kappos
*Director of the United States Patent and Trademark Office*

UNITED STATES PATENT AND TRADEMARK OFFICE
CERTIFICATE OF CORRECTION

PATENT NO. : 7,870,045 B2
APPLICATION NO. : 10/200736
DATED : January 11, 2011
INVENTOR(S) : Keiji Yagishita It is certified that error appears in the above-identified patent and that said Letters Patent is hereby corrected as shown below:

Column 16, Line 39 in Claim 8, after "array" insert -- , --.

Signed and Sealed this
Thirty-first Day of May, 2011

David J. Kappos
*Director of the United States Patent and Trademark Office*